United States Patent [19]

Akiyama et al.

[11] Patent Number: 6,022,247

[45] Date of Patent: *Feb. 8, 2000

[54] ELECTRIC WIRING BLOCK

[75] Inventors: Shinichi Akiyama; Hidetoshi Sato; Takeshi Ohba; Kazuaki Yokoyama, all of Shizuoka; Tsutomu Ishimaru, Hokkaido, all of Japan

[73] Assignee: Yazaki Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/987,501

[22] Filed: Dec. 9, 1997

[30] Foreign Application Priority Data

Dec. 10, 1996 [JP] Japan .................................. 8-329810

[51] Int. Cl.$^7$ ................................................ H01R 13/502
[52] U.S. Cl. .......................... 439/701; 439/949; 439/76.2
[58] Field of Search .................................. 439/76.2, 949, 439/701, 212

[56] References Cited

U.S. PATENT DOCUMENTS

| | | | |
|---|---|---|---|
| 4,909,745 | 3/1990 | Hayashi ............................. | 439/76.2 |
| 5,207,591 | 5/1993 | Ozaki et al. ........................ | 439/949 |
| 5,285,011 | 2/1994 | Shimochi ........................... | 439/76.2 |
| 5,581,130 | 12/1996 | Boucheron ......................... | 439/76.2 |

FOREIGN PATENT DOCUMENTS

| | | | |
|---|---|---|---|
| 5-11289 | 2/1993 | Japan ................................. | H01H 85/56 |
| 6-233434 | 8/1994 | Japan ................................. | H02G 3/16 |

Primary Examiner—Steven L. Stephan
Assistant Examiner—T C Patel
Attorney, Agent, or Firm—Morgan, Lewis & Bockius LLP

[57] ABSTRACT

An electric wiring block composed of a block main body and various cassette blocks. The block main body includes a plurality of cassette receiving chambers which are identical in shape with each other and into which the cassette blocks are received, and, on the respective inner peripheral walls of the cassette receiving chambers, securing ribs are respectively provided. Also, on the outer peripheral wall of the block main body, external securing ribs for option cassettes are provided, while the external securing ribs are identical in shape with the securing ribs. Further, on the outside portions of the cassette blocks, which are identical in shape with each other and are used in common with different kinds of electric parts, lock claws are provided for inserting the cassette blocks into the cassette receiving chambers, and option lock claws are provided for fixing the cassette blocks to the outside portion of the block main body.

19 Claims, 30 Drawing Sheets

ELECTRIC WIRING BLOCK

BACKGROUND OF THE INVENTION

1. Field of the Invention

The present invention relates to an electric wiring block which is used to connect together wiring harnesses or electric devices provided in the interior portion of a vehicle, and includes electric parts such as fuses, relays and the like.

2. Description of the Related Art

At the present, a vehicle is automatically controlled and carries an AV device and a navigation apparatus on board. An inevitable consequence of is that in wiring members such as a wiring harness, a connector and the like for the purpose of safety, fuses in a vehicle are increasing in number. In order to connect such wiring members, fuses and the like efficiently as well as to simplify the maintenance thereof, an electric wiring block as shown in FIG. 38 is being used (see Japanese Patent Unexamined Publication No. Hei. 6-233434).

One electric wiring block A is a junction box which is interposed between wiring harnesses for a vehicle. The electric wiring block A includes connectors 101 and a fuse block 102 on the surface thereof, and further includes, in the interior portion thereof, an electric circuit which is composed of a bus bar 103. Also, the other electric wiring block B is a relay box which includes a relay socket 104 on the surface thereof and further includes, in the interior portion thereof, an electric circuit which is composed of a bus bar 105. The electric wiring block B is fitted into a cut-away space 106 formed in the electric wiring block A and is then fixed thereto by securing claws 107 and stepped portions 108.

A terminal 103a of the bus bar 103 stands up on the surface of the electric wiring block A, while a terminal 105a of the bus bar 105 stands up on the end portion of the electric wiring block B in correspondence to the terminal 103a.

As shown in FIG. 39, with the electric wiring block B connected to the electric wiring block A, if a fusible link 110 is fitted with them, then the electric circuits of the bus bars 103 and 105 are connected with each other through the fusible link 110. Also, a protection cover 111 is placed over the terminal 103a to insulate and cover the same when the electric wiring block B is not used.

Also, conventionally, there is disclosed a fuse block 120 which can be used in common and widely with respect to various circuits (see Japanese Utility Model Unexamined Publication No. Hei. 5-11289). As shown in FIG. 40, the fuse block 120 includes a plurality of terminal insertion and connection portions 124 which are so formed as to face the block surface 120a of the fuse block 120 and also into which respective tab terminals 123 of each of fuses 122 of a blade type can be inserted for connection. In particular, in the fuse block 120, a transverse distance $L_X$ and a longitudinal distance $L_Y$ between the two mutually adjoining terminal insertion and connection portions 124 are respectively set equal to a distance L between the respective tab terminals 123 of each fuse 122.

However, in the above-mentioned electric wiring block, since the fuse block 102 provided on the surface of the electric wiring block A, the electric wiring block B consisting of a relay box, and the like are respectively molded as integral bodies, they are not able to cope with the presence or absence of the electric parts such as a relay, a fuse and the like which depend on the specifications of vehicles. Thus some of the housings can be vacant, with the result that the material costs of the vacant housings and the space used for the vacant housings are wasted.

Also, since the above-mentioned blocks are not compatible with other kinds of vehicles, not only can they not be used at all with other kinds of vehicles, but also the elements of these blocks are not able to follow the changes of the circuits subject to the change of manufacturer's specifications or to cope with the options of various vehicles.

Also, in the fuse block 120, only one kind of fuse can be easily provided on the surface of the fuse block 120. However a connection operation to connect a connecting terminal to an electric conduction passage such as a bus bar-or the like from the back surface of the block 120 is necessary, so that the fuse block 120 cannot be applied to other kinds of electric parts such as a relay and the like.

Further, in the fuse block 120, since the bus bars wired in the respective receiving chambers 124 or terminal insertion and connection portions 124 are large in size, when the specifications of the vehicle are changed, there are portions of the fuse block that are not used. In other words some of the bus bars and receiving chambers are wasted, which raises an inconvenient problem.

SUMMARY OF THE INVENTION

In view of the above-mentioned drawbacks found in the conventional electric wiring blocks, it is an object of the invention to provide an electric wiring block which not only can adapt various electric parts to various variations but also can form an electric conduction passage easily.

In order to achieve the above object, the invention provides an electric wiring block comprising: a plurality of electric parts including a fuse and a relay to be mounted at their given positions; and a plurality of cassette blocks identical in shape with each other for respectively classifying different ones of the electric parts into various blocks.

DETAILED DESCRIPTION OF THE PREFERRED EMBODIMENTS

Figure 1:
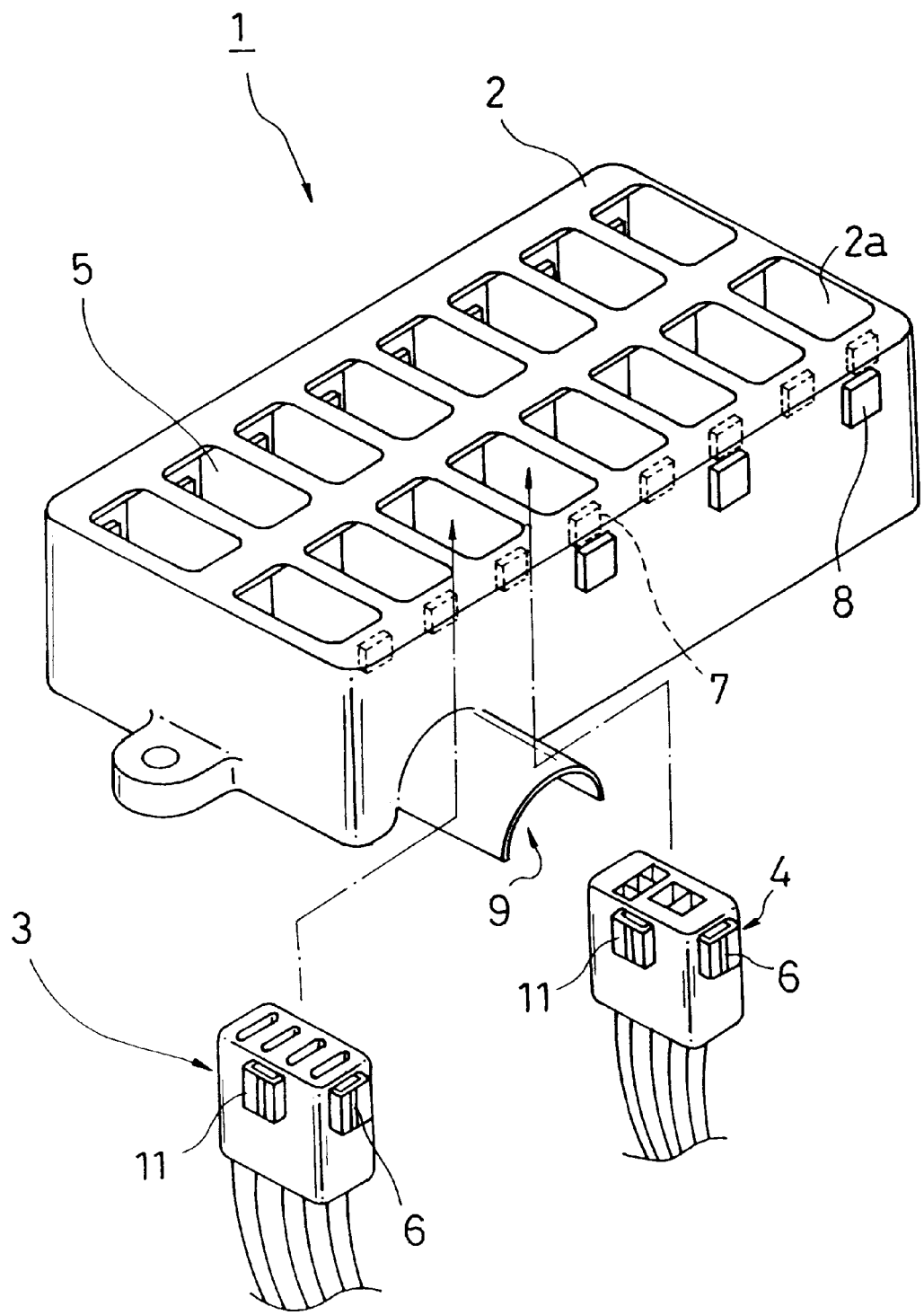
FIG. 1 is an exploded perspective view of a first embodiment of an electric wiring block according to the invention.
Figure 2:
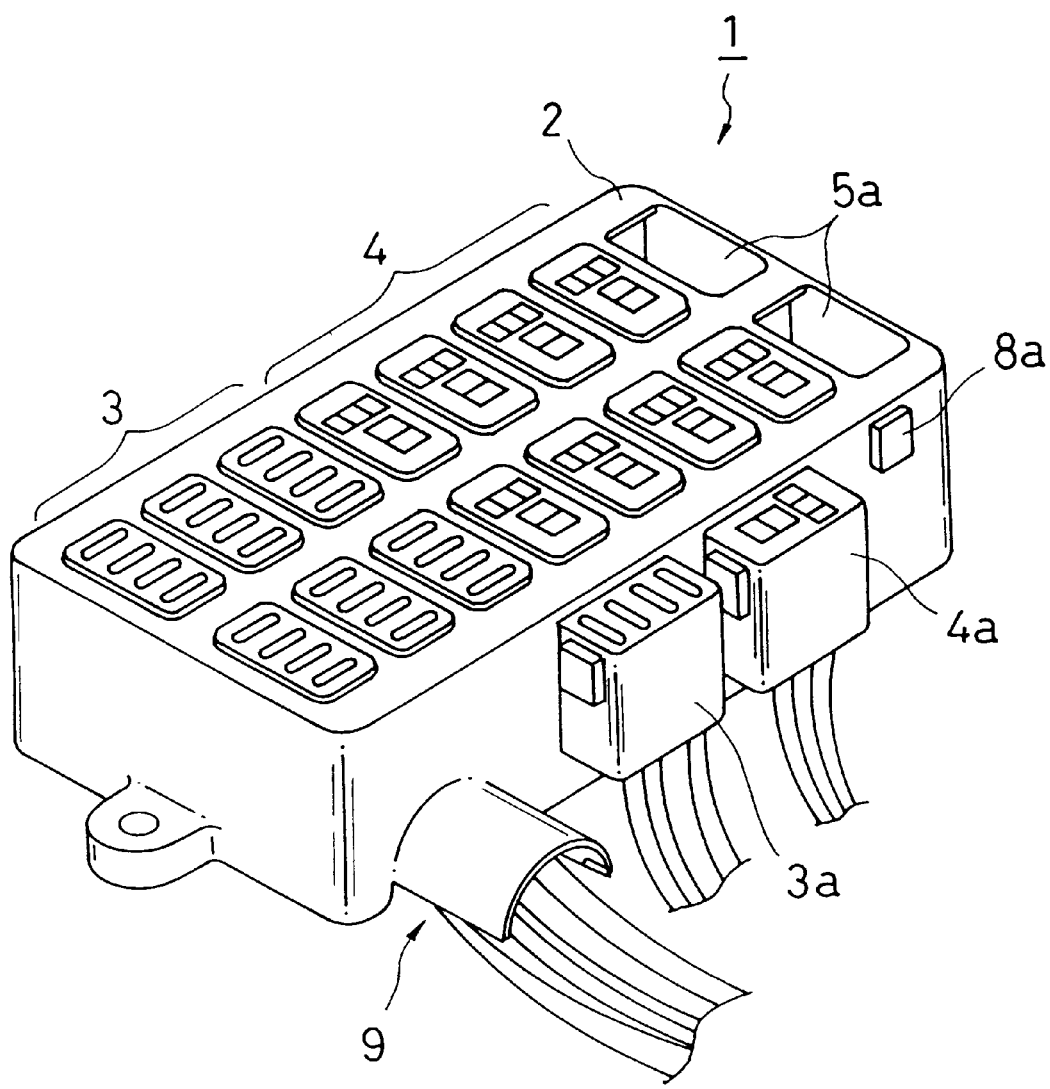
FIG. 2 is a perspective view of the electric wiring block shown in FIG. 1, showing a state thereof in which the assembly thereof is completed.
Figure 3:
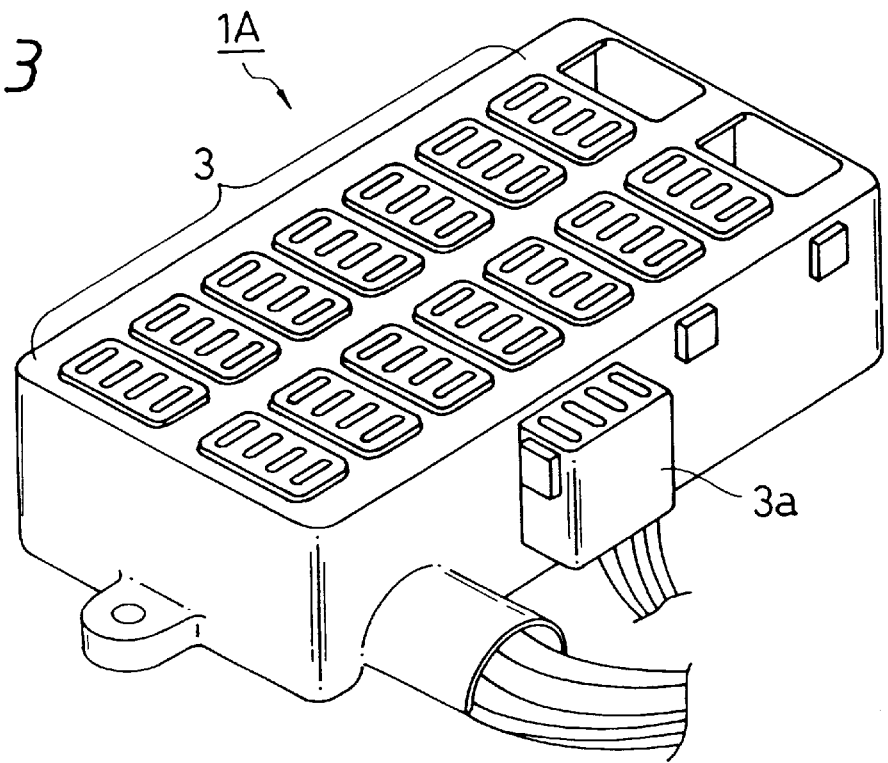
FIG. 3 is a perspective view of another example according to the first embodiment different from the electric wiring block shown in FIG. 2, showing a state thereof in which it is assembled as a fuse block.
Figure 4:
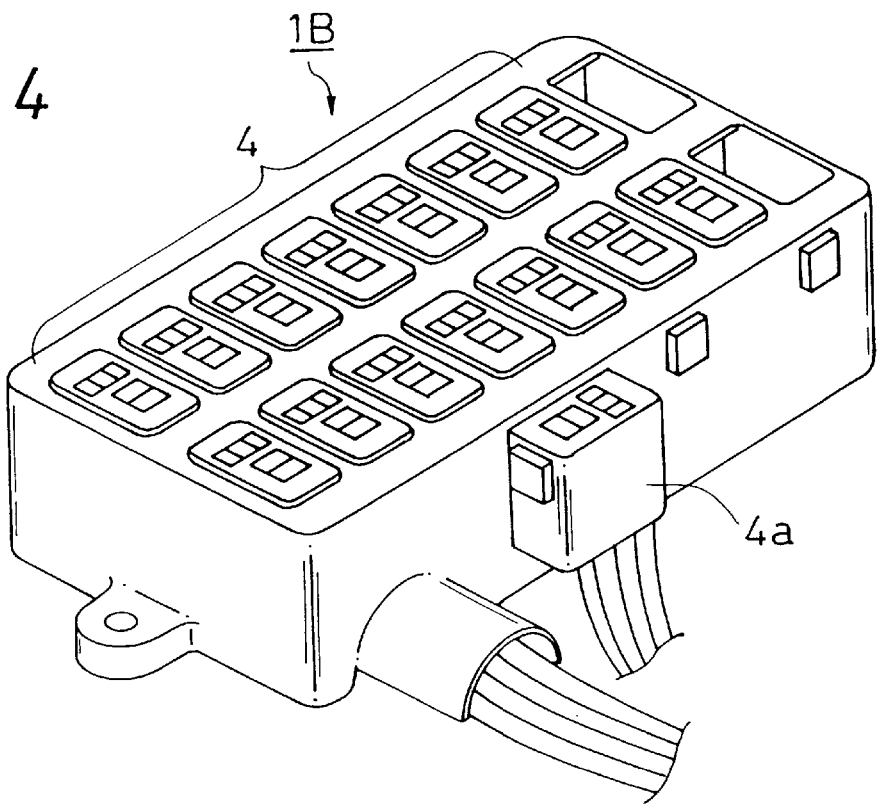
FIG. 4 is a perspective view of still another example according to the first embodiment different from the electric wiring block shown in FIG. 2, showing a state thereof in which it is assembled as a relay block.
Figure 5:
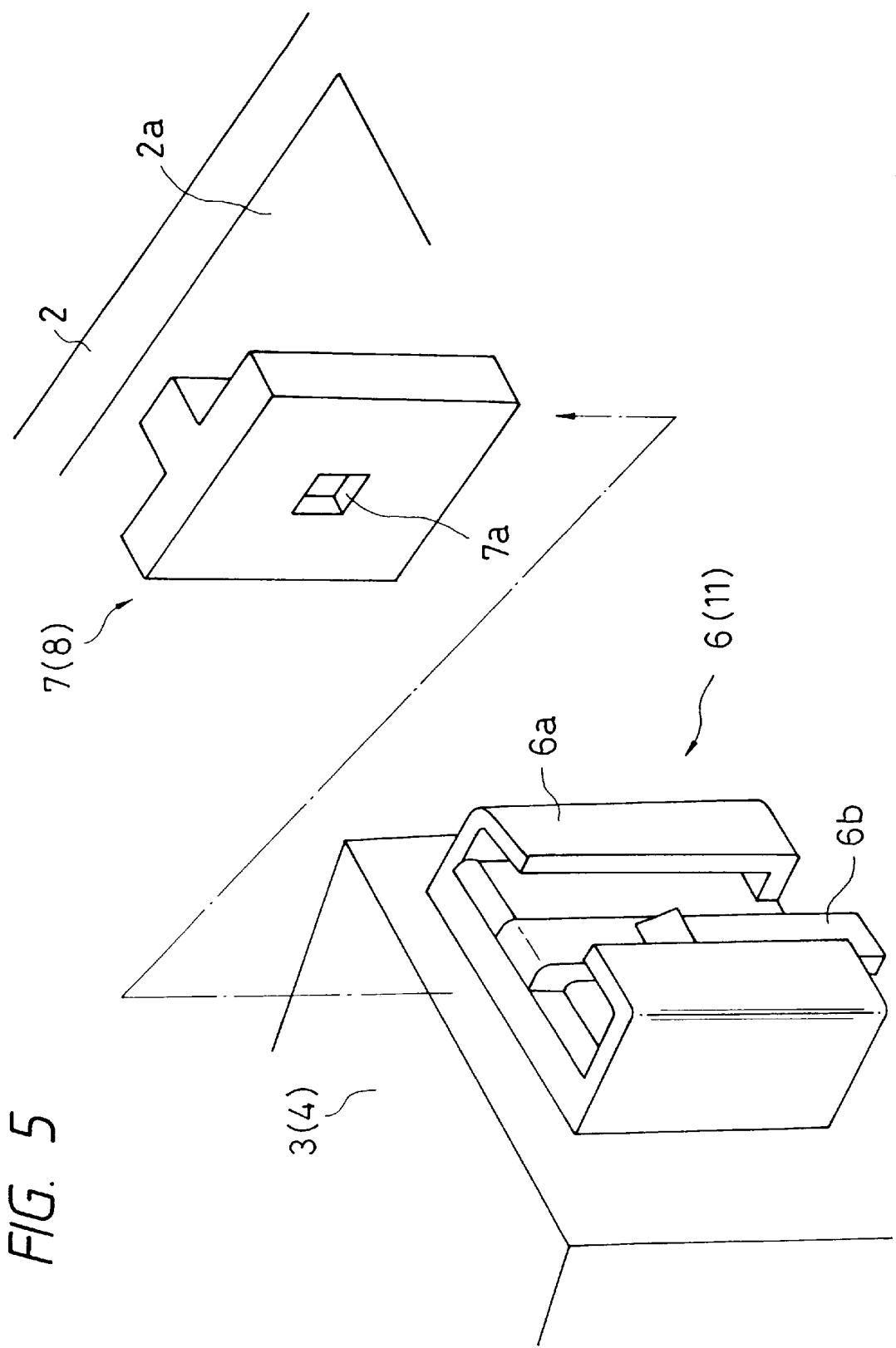
FIG. 5 is a perspective view of the structures of first and second lock portions employed in the electric wiring block shown in FIG. 1.
Figure 6:
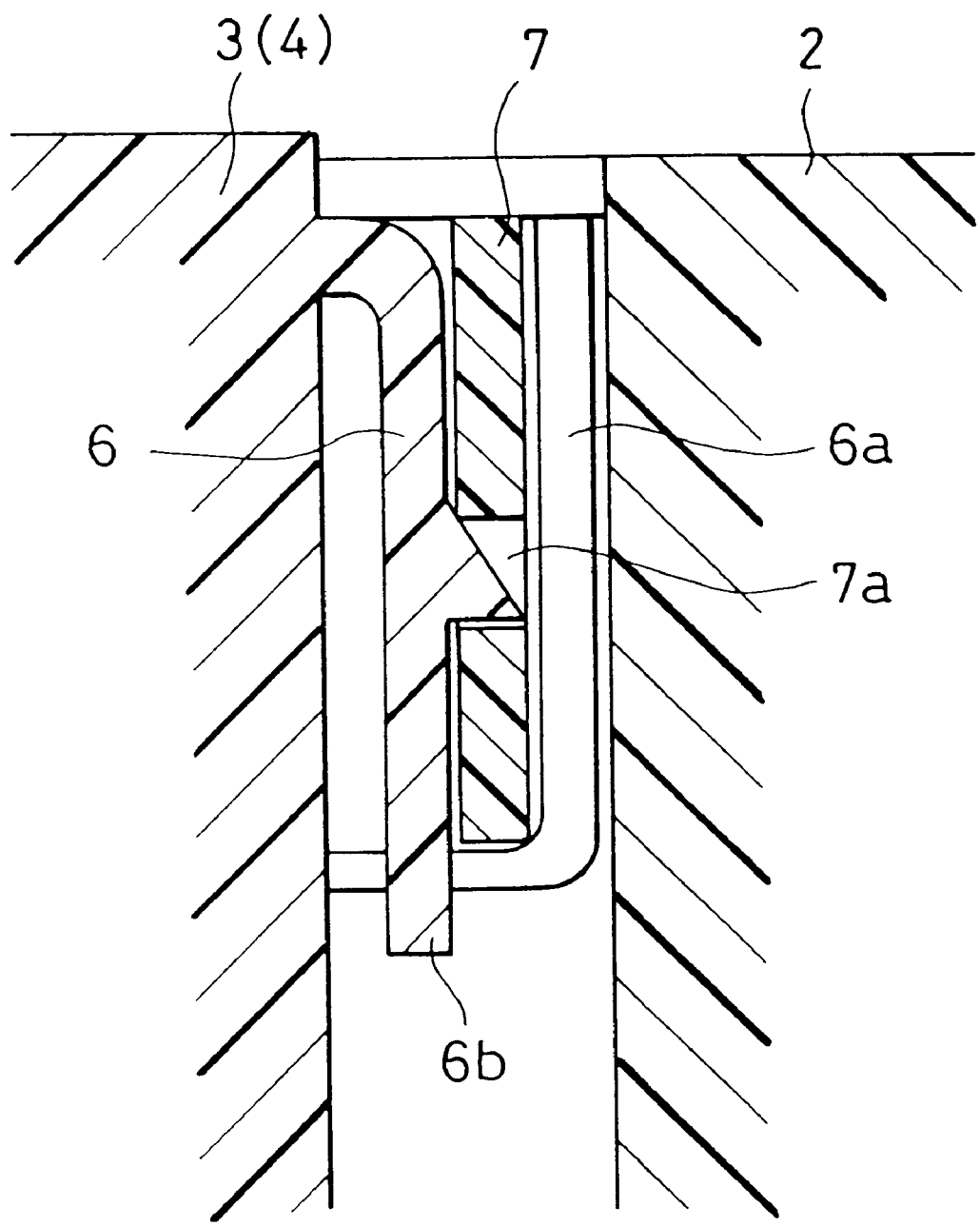
FIG. 6 is a section view of the first and second lock portions shown in FIG. 5.

Now, description will be given below in detail of a first embodiment of an electric wiring block according to the invention with reference to FIGS. 1 to 6. In particular, FIG. 1 is an exploded perspective view of an electric wiring block according to the first embodiment. FIG. 2 is a perspective view of the electric wiring block shown in FIG. 1, showing a state thereof in which the assembly thereof is completed, FIG. 3 is a perspective view of another example according to the first embodiment different from the electric wiring block shown in FIG. 2, showing a state thereof in which it is assembled as a fuse block. FIG. 4 is a perspective view of still another example according to the first embodiment different from the electric wiring block shown in FIG. 2, showing a state thereof in which it is assembled as a relay block. FIG. 5 is a perspective view of the structures of first and second lock portions employed in the electric wiring block shown in FIG. 1, and FIG. 6 is a section view of the first and second lock portions shown in FIG. 5.

The electric wiring block 1 according to the first embodiment stores therein various electric parts such as a relay, a fuse and the like which are used as the accompaniments to an electric system of a vehicle. The electric wiring block 1 is composed of a block main body 2 to which the above-mentioned various electric parts are to be assembled, and various cassette blocks 3 and 4.

The block main body 2 is formed of synthetic resin into an integral body and it includes a plurality of cassette receiving chambers 5 which are respectively formed identical in shape with each other and are used to receive the above-mentioned various cassette blocks 3 and 4. In the inner peripheral wall 2a of each of the cassette receiving chambers 5, there is provided such a rectangular-plate-shaped securing rib 7 including a securing hole 7a formed in the center thereof as shown in FIG. 5. Also, in the outer peripheral wall of the block main body 2, there are provided a plurality of externally securing ribs 8 for securing option cassettes. The securing ribs 8 are respectively formed identical in shape with the securing ribs 7.

The cassette blocks which have the same shape and are to be respectively received into the cassette receiving chambers 5 are a plurality of fuse cassette blocks 3 into each of which four fuses can be mounted, and a plurality of relay cassettes 4 into each of which one relay can be mounted. These two kinds of cassette blocks have female type terminals (not shown) which are fixedly connected to connecting wires inserted therein.

Also, at given positions on the respective outside portions of the cassette blocks 3 and 4, lock claws 6 are provided as shown in FIG. 5 which are respectively to be secured to the securing ribs 7 formed in the cassette receiving chambers 5. Each of the lock claws 6 includes an engaging wall 6a, into which its associated securing rib 7 is to be fitted, and a securing lance 6b to be secured to its associated securing hole 7a. Further, at given positions on the respective outside portions of the cassette blocks 3 and 4, separately from the above-mentioned lock claws 6, there are provided option lock claws 11 which are to be fixed to external securing ribs 8 which are disposed on the outside portion of the block main body 2.

By the way, if the size of the relay varies, then the number of poles of the fuse also varies, while the size of the cassette block also varies according to the variations in the size of the relay.

Referring here to the insertion procedure for inserting the cassette blocks 3 and 4 into the block main body 2, as shown in FIG. 1, 6 pieces of fuse cassette blocks 3 and 8 pieces of relay cassette blocks 4 are received into the cassette receiving chambers 5 from below the block main body 2. Therefore, as shown in FIG. 2, in this case, there are vacant the two receiving chambers 5a that are located in the deepest side in FIG. 2. At that time, as shown in FIG. 6, the securing rib 7 is inserted into the engaging wall 6a of the lock claw 6 of the fuse cassette block 3 or relay cassette block 4, and the projection of the securing lance 6b is secured to the securing hole 7a of the securing rib 7, whereby the fuse cassette block 3 or relay cassette block 4 can be fixed to its corresponding cassette receiving chamber 5.

Also, as shown in FIG. 2, on the outer peripheral wall of the block main body 2, there are mounted an option fuse cassette block 3a and an option relay cassette block 4a, while one external securing rib 8a is vacant. By the way, the connecting wires, which are drawn out from the respective cassette blocks 3 and 4 received within the cassette receiving chambers 5, are taken out from a wire take-out hole 9 formed at a given position in the block main body 2 in such a manner that they are tied up in a bundle.

Further, in FIG. 3, there is shown a modification consisting of a fuse block 1A in which 14 pieces of only the fuse cassette blocks 3 are assembled, while a single piece of option fuse cassette block 3a is mounted on the outside portion of the fuse block 1A.

Still further, in FIG. 4, there is shown another modification consisting of a relay block 1B in which 14 pieces of only the relay cassette blocks 4 are assembled, while a single piece of option relay cassette block 4a is mounted on the outside portion of the relay block 1B.

As described above, with use of the electric wiring block 1 according to the present embodiment, a desired number of various cassette blocks 3 and 4 required according to the vehicle specifications can be easily fitted into the cassette receiving chambers 5 of the block main body 2. Therefore, even when the number of poles of fuses and relays increases or decreases, such increase or decrease can be dealt with simply by changing the number of the cassette blocks 3 and 4 to be fitted. That is, by changing the combinations of the cassette blocks 3 and 4, there can be realized two or more kinds of structures, which makes it possible to provide a highly general-purpose electric wiring block which is able to cope with various vehicle specifications.

Also, insertion of the cassette blocks 3 and 4 into the cassette receiving chambers 5 from below the block main body 2 makes it possible to fix the cassette blocks 3 and 4 positively and easily. Further, since the securing ribs 7 serving as the first lock portion as well as the lock claws 6 serving as the second lock portion are structured such that they can be used in common, the cassette blocks 3 and 4 can be fixed at desired positions.

Figure 7:
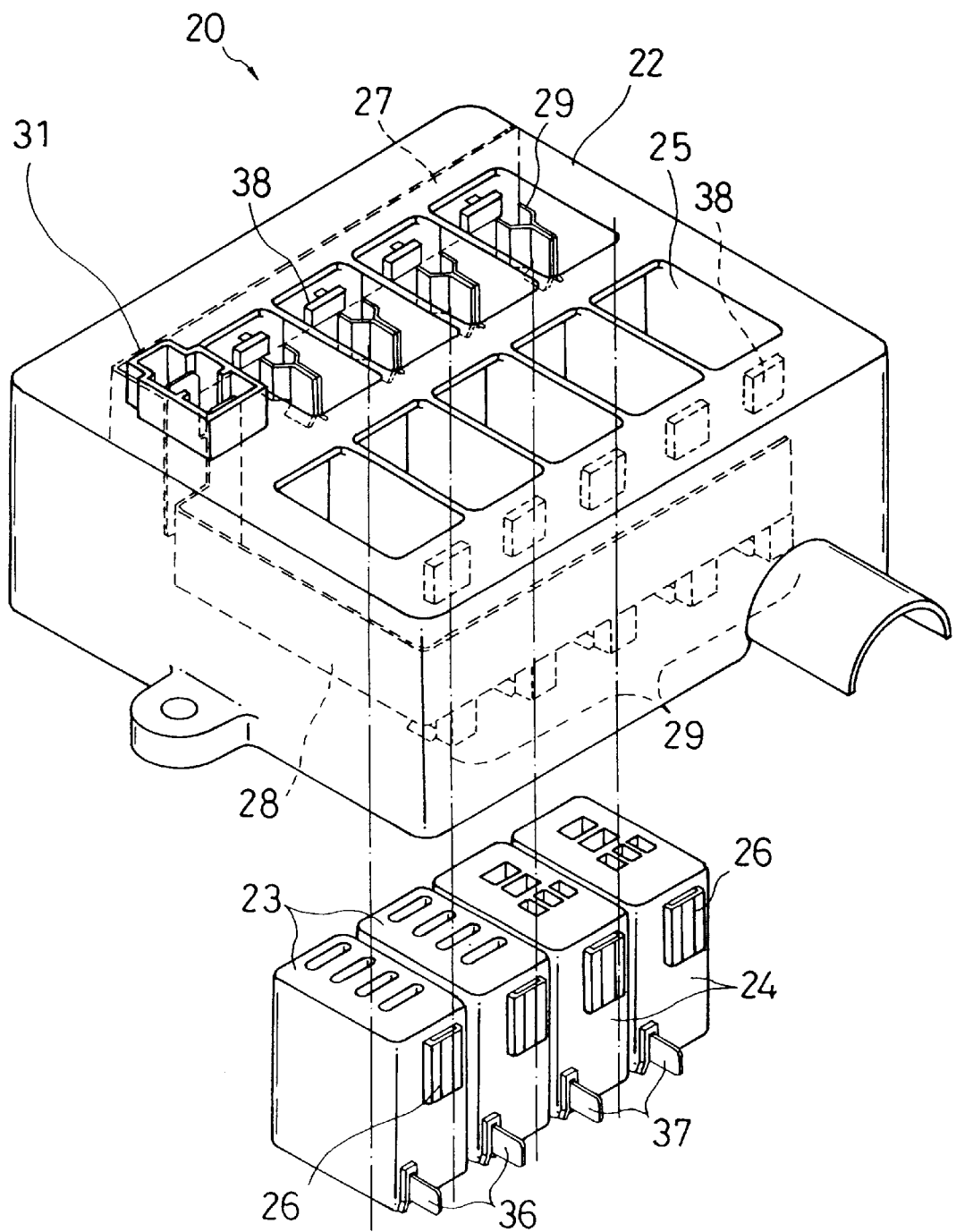
FIG. 7 is an exploded perspective view of a second embodiment of the electric wiring block according to the invention.
Figure 8:
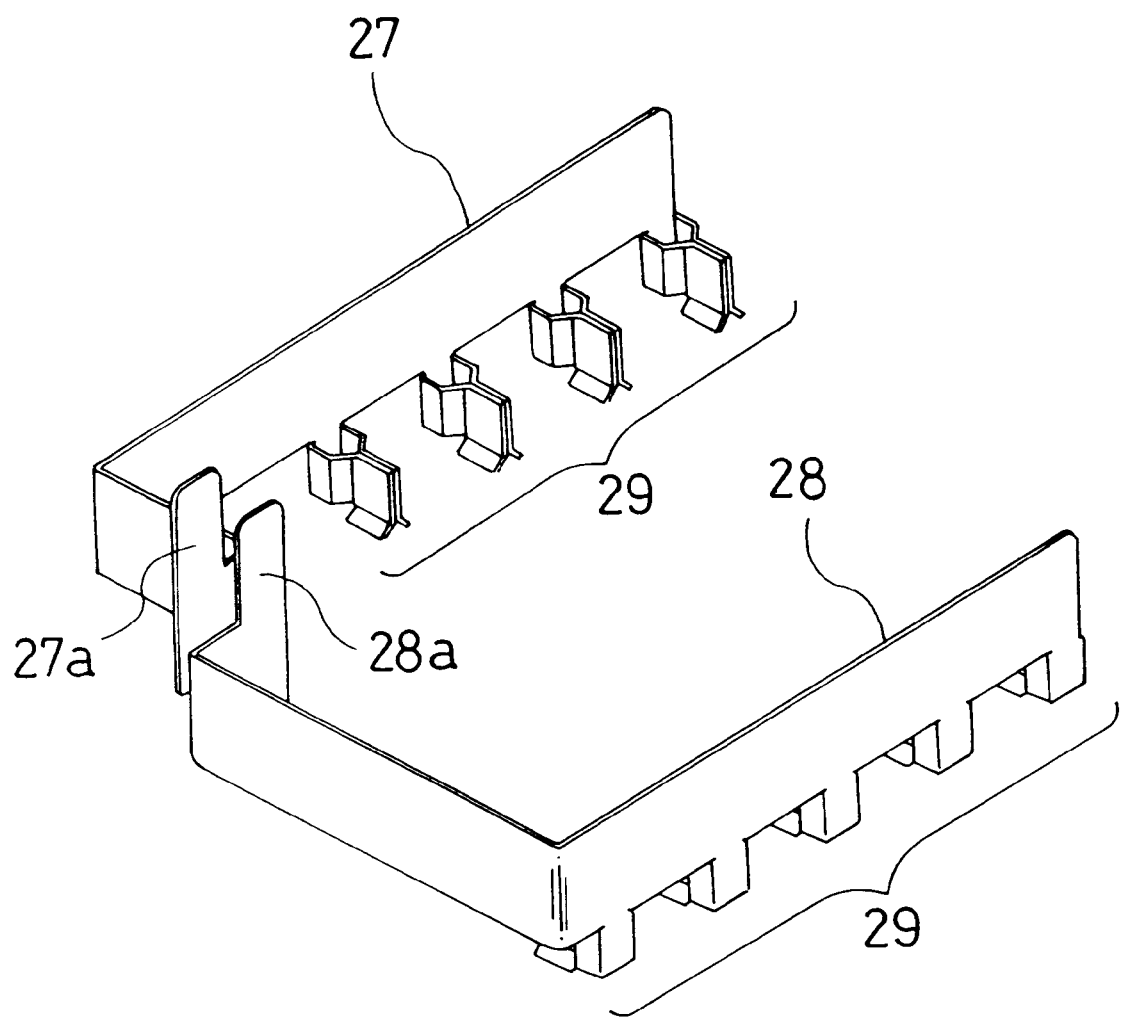
FIG. 8 is a perspective view of the structure of a power distributing bus bar which is to be assembled to the block main body of the electric wiring block according to the second embodiment.
Figure 9:
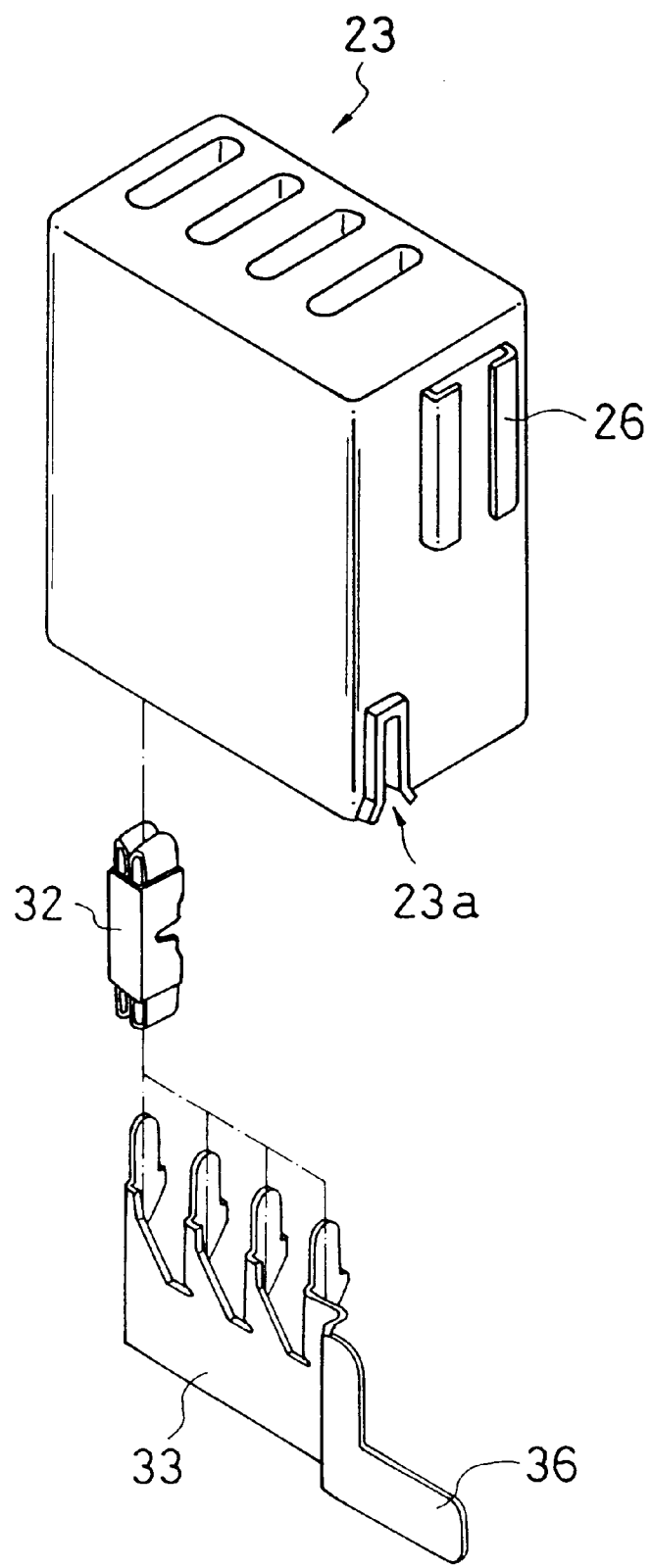
FIG. 9 is an exploded perspective view of a fuse cassette block which is to be inserted into the above block main body.
Figure 10:
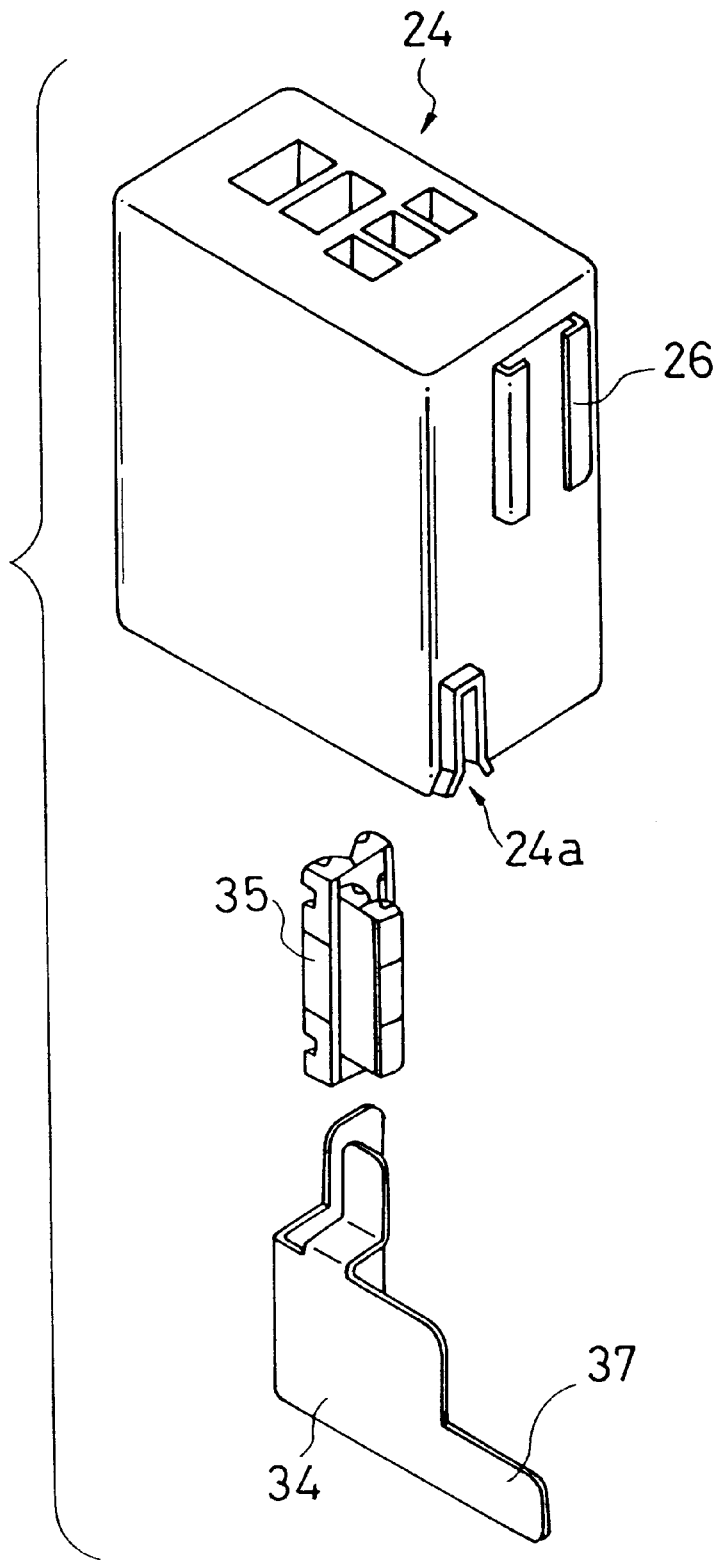
FIG. 10 is an exploded perspective view of a relay cassette block which is to be inserted into the above block main body.
Figure 11:
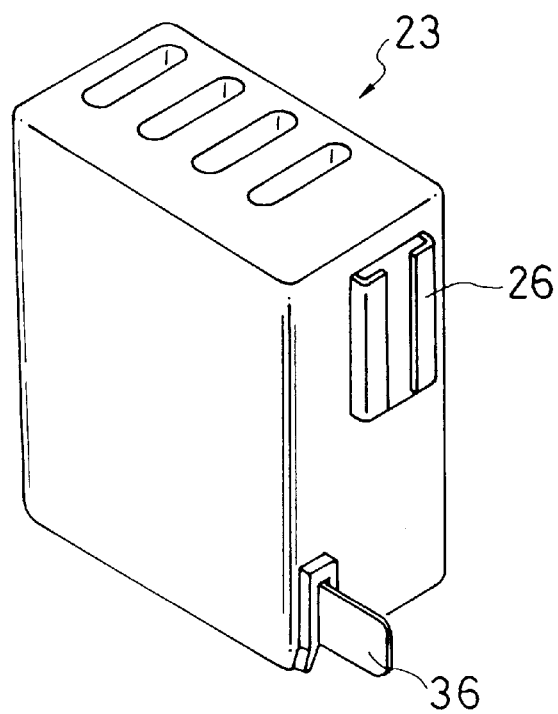
FIG. 11 is a perspective view of the above fuse cassette block, showing a state thereof in which the assembly thereof is completed.
Figure 12:
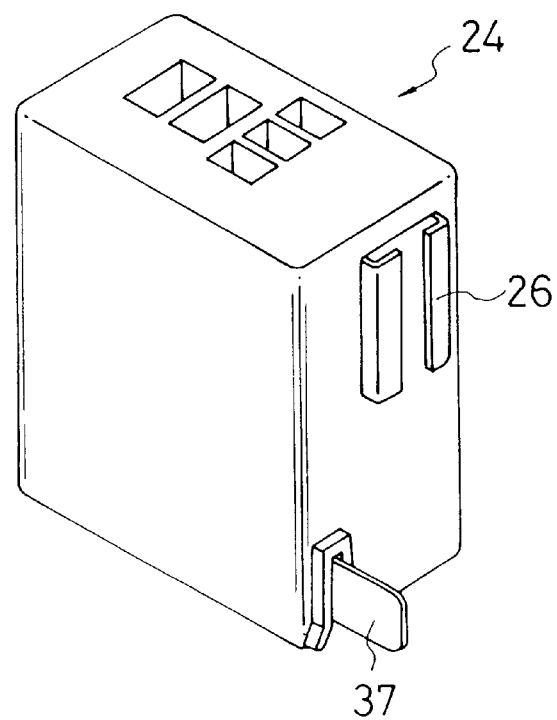
FIG. 12 is a perspective view of the above relay cassette block, showing a state thereof in which the assembly thereof is completed.
Figure 13:
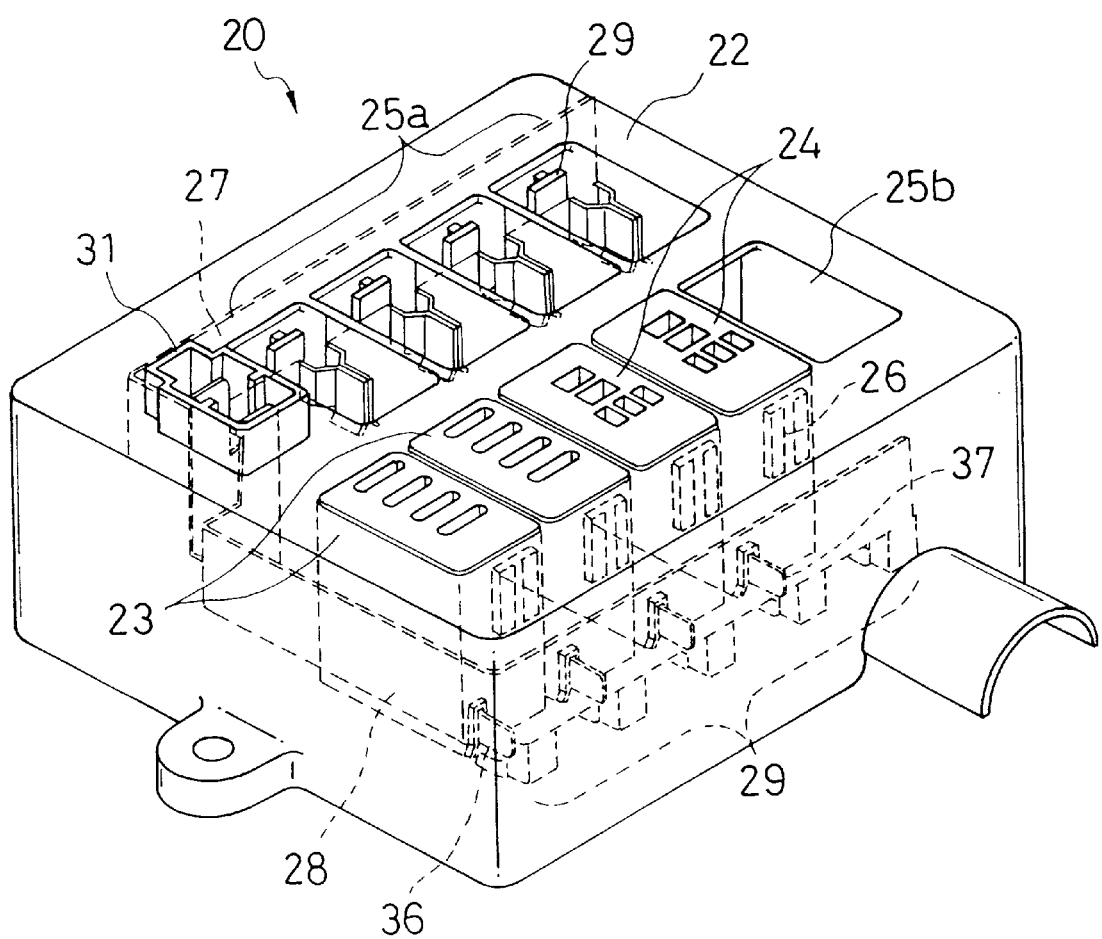
FIG. 13 is a perspective view of the present electric wiring block, showing a state thereof in which the assembly thereof is completed.

Next, description will be given below in detail of a second embodiment of the electric wiring block according to the invention with reference to FIGS. 7 to 13. Specifically, FIG. 7 is an exploded perspective view of an electric wiring block according to the second embodiment. FIG. 8 is a perspective view of the structure of a power distributing bus bar which is to be assembled to the block main body. FIG. 9 is an exploded perspective view of a fuse cassette block which is to be inserted into the block main body. FIG. 10 is an exploded perspective view of a relay cassette block which is to be inserted into the block main body. FIG. 11 is a perspective view of the fuse cassette block, showing a state thereof in which the assembly thereof is completed. FIG. 12 is a perspective view of the relay cassette block, showing a state thereof in which the assembly thereof is completed, and FIG. 13 is a perspective view of the present electric wiring block, showing a state thereof in which the assembly thereof is completed. By the way, in the second embodiment, the detailed description of parts having the same structure and operations as those employed in the first embodiment is omitted here.

An electric wiring block 20 according to the present embodiment comprises a block main body 22 including therein a plurality of cassette receiving chambers 25 which are respectively formed identical in shape with each other, and various cassette blocks 23 and 24.

The block main body 22 is formed of synthetic resin into an integral body, while such power distributing bus bars 27 and 28 as shown in FIG. 8 are insert molded in the interior portion of the block main body 22. The power distributing bus bars 27 and 28 respectively include, at their given positions, fitting portions 29 which respectively have a spring property. The power distributing bus bars 27 and 28 further include, at their respective one-side end portions, male tabs 27a and 28a which are to be connected to the power source.

Also, the block main body 22 includes on the upper surface thereof a connector portion 31 with which a power supplying connector (not shown) can be fitted. Further, in the respective peripheral walls of the cassette receiving chambers 25, there are respectively provided securing ribs 38 which have the same structure as shown in FIG. 5.

The cassette blocks which are respectively formed identical in shape with each other and are to be received into the cassette receiving chambers 25 are two fuse cassette blocks 23, into each of which four pieces of fuses can be mounted, and two relay cassette blocks 24 into each of which a single piece of relay can be mounted. Also, cassette bus bars 33 and 34 corresponding to the power distributing bus bars 27 and 28 are inserted into the two kinds of cassette blocks, respectively.

That is, as shown in FIGS. 9 and 11, a fuse female type terminal 32, which serves as a relay terminal to which the leg of a fuse can be connected, is fixed to the interior portion of the fuse cassette block 23, and the fuse cassette bus bar 33 is connected to the female type terminal 32. In the end portion of the fuse cassette bus bar 33, there is formed a male tab 36 which can be connected to the fitting portions 29 of the above-mentioned power distributing bus bars 27 and 28.

The male tab 36 is structured such that, when the fuse cassette bus bar 33 is inserted into the fuse cassette block 23, it can project out from a projection-purpose opening 23a formed in the lower end of the fuse cassette block 23. Also, at a given position on the outer peripheral wall of the fuse cassette block 23, there is provided a lock claw 26 which can be engaged with the securing rib 38 and has the same structure as that shown in FIG. 5.

Also, as shown in FIGS. 10 and 12, a relay female type terminal 35, which serves as a relay terminal to which the leg of a relay can be connected, is fixed to the interior portion of the relay cassette block 24, while the relay cassette bus bar 34 is connected to the female type terminal 35. In the end portion of the relay cassette bus bar 34, similarly to the above-mentioned fuse cassette bus bar 33, there is formed a male tab 37 which can be connected to the fitting portions 29 of the power distributing bus bars 27 and 28.

The male tab 37 is structured such that, when the relay cassette bus bar 34 is inserted into the relay cassette block 24, it can project out from a projection-purpose opening 24a formed in the lower end of the relay cassette block 24. Also, on the outer peripheral wall of the relay cassette block 24, there is provided a lock claw 26 which can be engaged with the securing rib 38 and has the same structure as the lock claw 26 of the fuse cassette block 23.

Referring now to the insertion procedure for inserting the cassette blocks 23 and 24 into the block main body 22, as shown in FIG. 7, two fuse cassette blocks 23 and two relay cassette blocks 24 are received into the cassette receiving chambers 25 from below the block main body 22. Therefore, as shown in FIG. 13, in this case, four cassette receiving chambers 25a arranged on the far side of FIG. 13 as well as one cassette receiving chamber 25b arranged in the right end portion on the near side of FIG. 13 are vacant.

On the other hand, the male tabs 36 and 37 projecting from the cassette blocks 23 and 24 are respectively connected to the fitting portion 29 of the power distributing bus bar 28, and the power supplied from the connector portion 31 is distributed through the power distributing bus bar 28 to the cassette bus bars 33 and 34 within the respective cassette blocks 23 and 24.

As described above, with use of the electric wiring block 20 according to the second embodiment, if a required number of cassette blocks 23 and 24 are fitted into the block main body 22 according to the vehicle specifications, then the male tabs 36 and 37 of the cassette bus bars 33 and 34 projecting out from the projection-purpose openings 23a and 24a of the cassette blocks 23 and 24 are respectively connected to the fitting portions 29 of the power distributing bus bars 27 and 28 arranged within the block main body 22.

Therefore, the parallel distribution of the power to various cassette blocks 23 and 24 can be achieved positively and easily and also employment of the bus bars can reduce greatly the number of the connecting wires and connecting terminals used.

Figure 14:
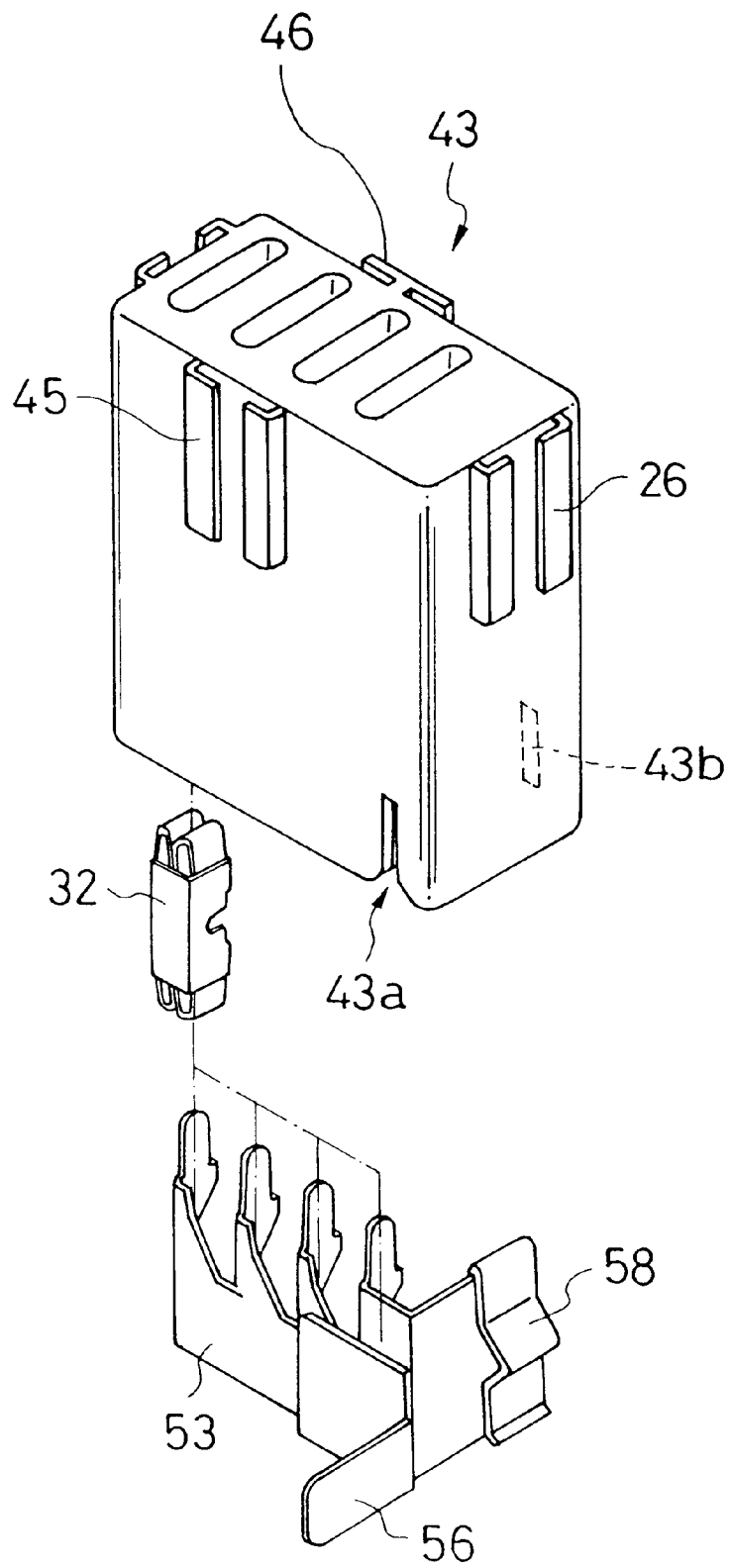
FIG. 14 is an exploded perspective view of a fuse cassette block which is to be inserted into an electric wiring block according to a third embodiment of the invention.
Figure 15:
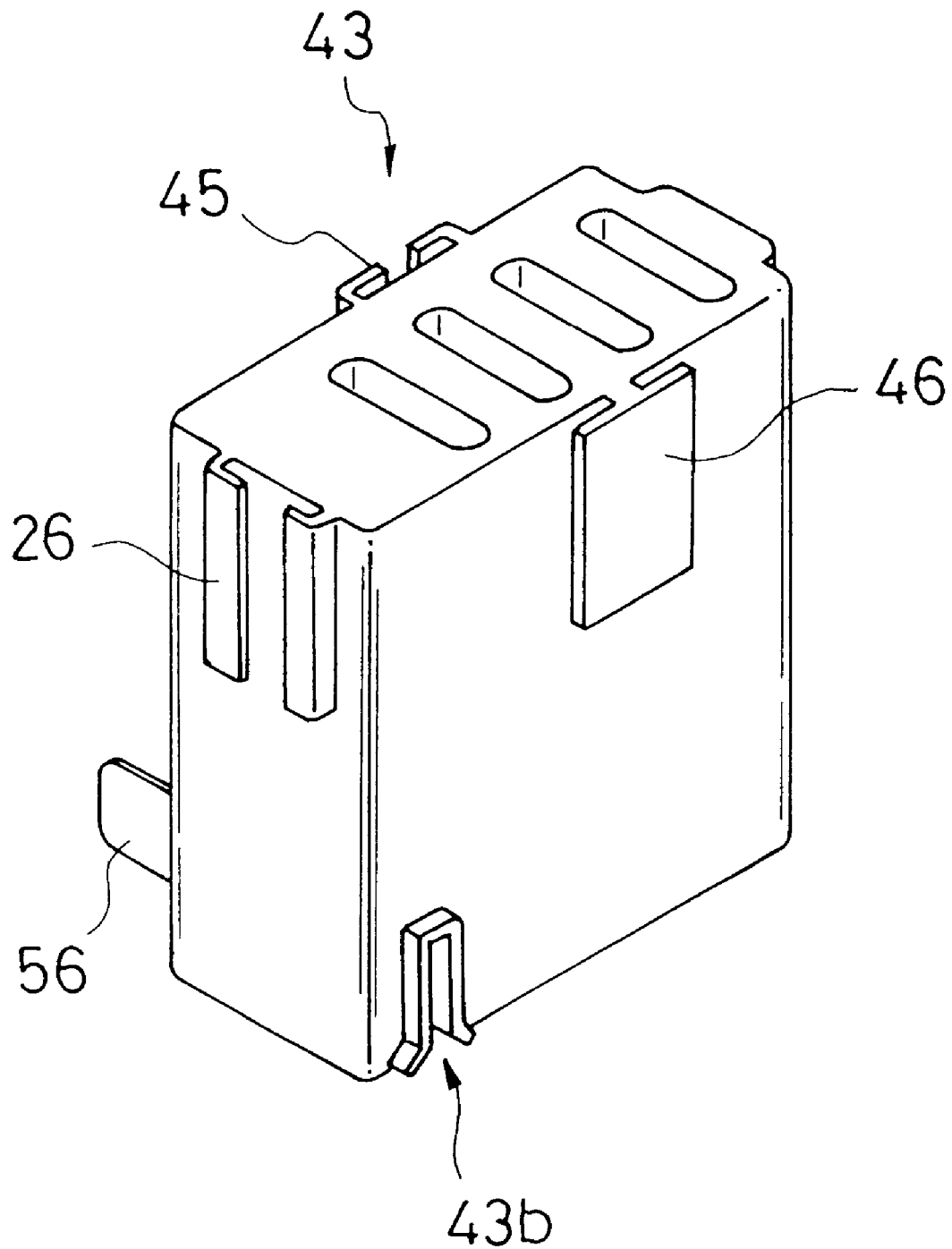
FIG. 15 is a perspective view of the fuse cassette block shown in FIG. 14, in which the assembly completion state thereof is viewed from the back surface side thereof.
Figure 16:
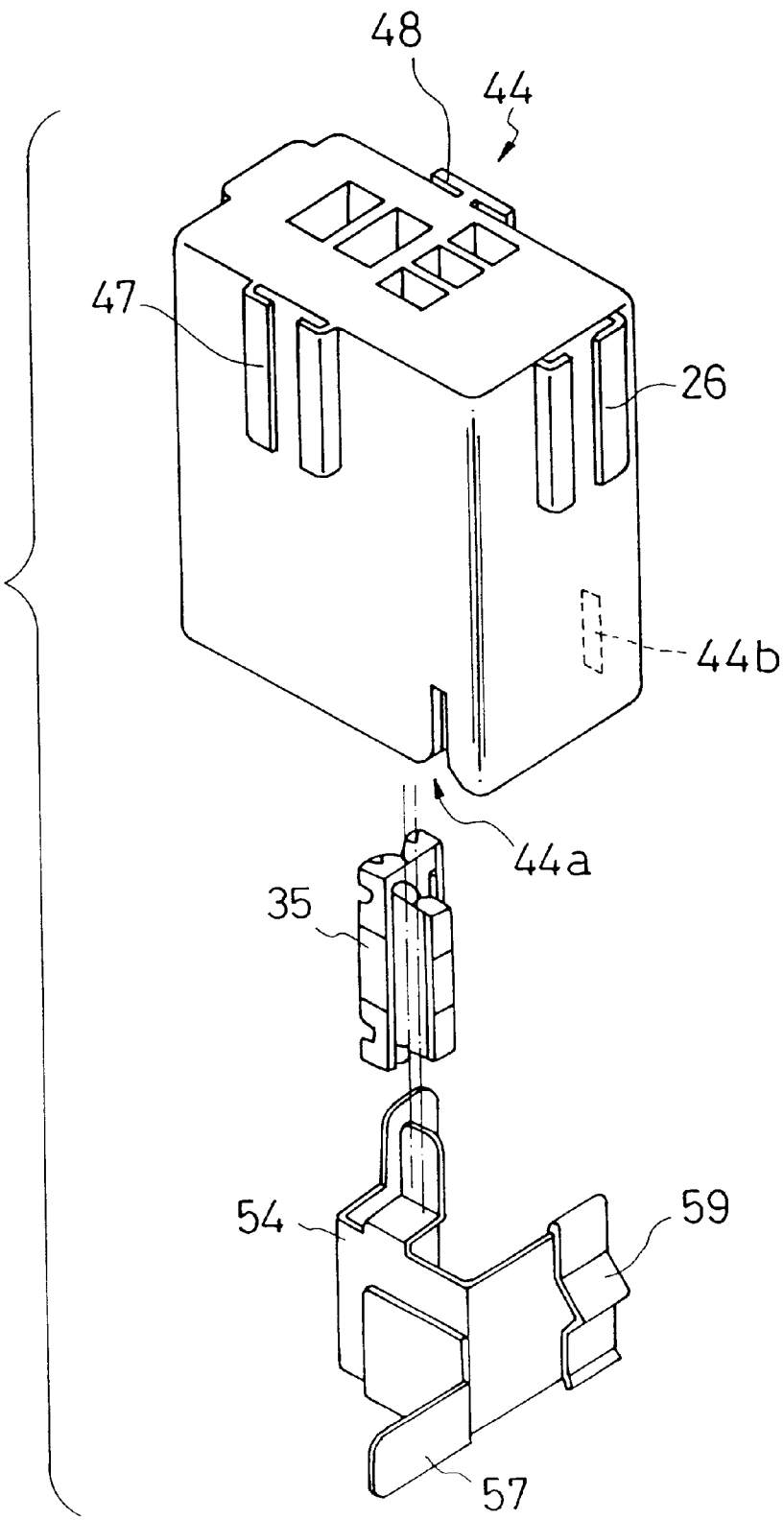
FIG. 16 is an exploded perspective view of a relay cassette block which is to be inserted into the electric wiring block according to the third embodiment.
Figure 17:
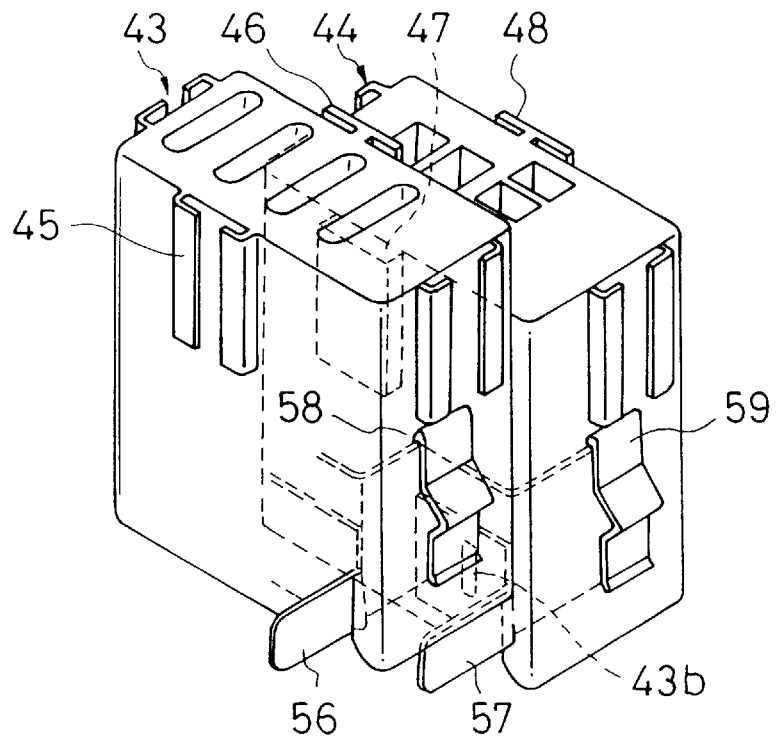
FIG. 17 is a perspective view of the fuse cassette block and relay cassette block according to the third embodiment, showing a state thereof in which their mutual connection is under way.
Figure 18:
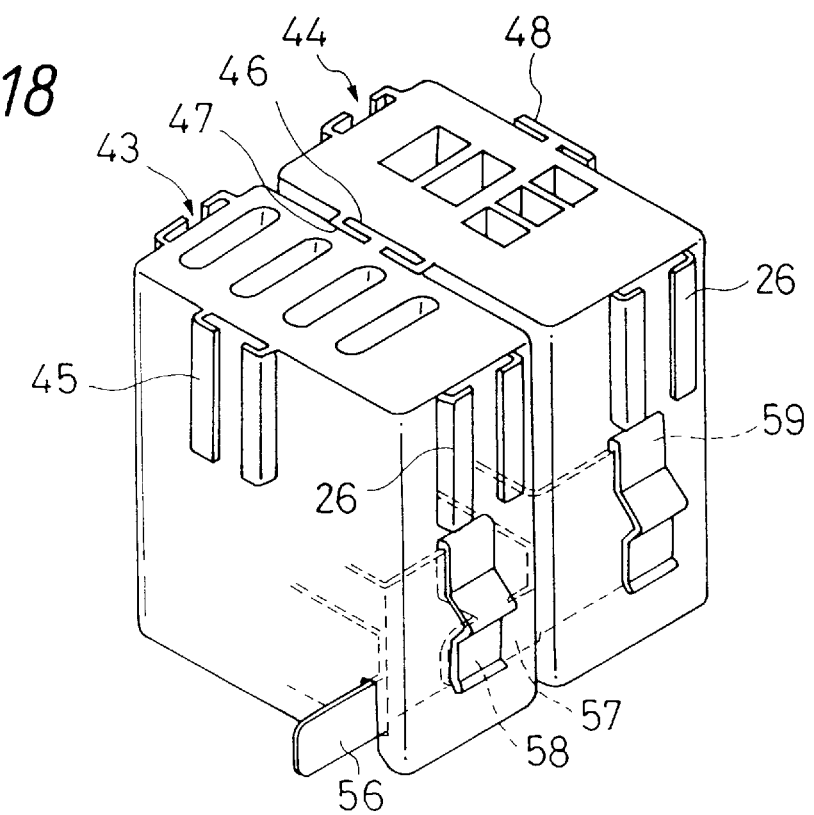
FIG. 18 is a perspective view of the fuse cassette block and relay cassette block, showing a state thereof in which the connection thereof shown in FIG. 17 is completed.

Next, description will be given below in detail of a third embodiment of the electric wiring block according to the invention with reference to FIGS. 14 to 18. Specifically, FIG. 14 is an exploded perspective view of a fuse cassette block which is to be inserted into the electric wiring block according to the third embodiment. FIG. 15 is a perspective view of the fuse cassette block shown in FIG. 14, in which the assembly completion state thereof is viewed from the back surface side thereof. FIG. 16 is an exploded perspective view of a relay cassette block which is to be inserted into the electric wiring block according to the third embodiment. FIG. 17 is a perspective view of the fuse cassette block and relay cassette block, showing a state thereof in which they are under connection, and FIG. 18 is a perspective view of the fuse cassette block and relay cassette block, showing a state thereof in which the connection thereof shown in FIG. 17 is completed. By the way, in the third embodiment, the detailed description of parts having the same structure and operations as those employed in the first and second embodiments is omitted here.

As shown in FIG. 14, according to the third embodiment, there is employed a fuse cassette block 43, to the interior portion of which is fixed a fuse female type terminal 32 to which a fuse can be connected, while a fuse cassette bus bar 53 is connected to the female type terminal 32. In the end portion of the fuse cassette bus bar 53, there is formed a male tab 56 which can be connected to a power distributing bus bar. The fuse cassette bus bar 53 further includes a fitting portion 58 which is formed at a position opposed to the male tab 56 and to which the male tab of a mating cassette bus bar can be connected.

Also, the fuse cassette block 43 further includes in the lower end portion thereof a projection-purpose opening 43a from which the male tab 56 can project out. In particular, if the fuse cassette bus bar 53 is inserted into the fuse cassette block 43, then the male tab 56 projects out from the projection-purpose opening 43a. Further, as shown in FIG. 15, on the back surface side of the cassette block 43 that is situated opposed to the projection-purpose opening 43a, there is formed an insertion-purpose opening 43b through which the male tab of a cassette bus bar projecting from another adjoining cassette block can be inserted.

Still further, as shown in FIGS. 14 and 15, the fuse cassette block 43 further includes, on the insertion-purpose opening 43b side thereof, a securing rib 46 serving as a first lock portion with which another adjoining cassette block can be engaged, and, on the projection-purpose opening 43a side thereof, a lock claw 45 which corresponds to the securing rib 46 and serves as a second lock portion. Also, on the outside of the fuse cassette block 43, there is provided a lock claw 26 which has the same structure as that shown in FIG. 5 and is used to fix the fuse cassette block 43 to the block main body.

On the other hand, as shown in FIG. 16, the relay cassette block 44 includes a relay female type terminal 35 which is fixed to the interior portion of the relay cassette block 44 and to which a relay can be connected, while a relay cassette bus bar 54 can be connected to the female type terminal 35. In the end portion of the relay cassette bus bar 54, similarly to the fuse cassette bus bar 53, there is formed a male tab 57 which can be connected to the power distributing bus bar. The relay cassette bus bar 54 further includes a fitting portion 59 which is formed at a position opposed to the male tab 57 and to which the male tab of a mating cassette bus bar can be connected.

Also, the relay cassette block 44 further includes a projection-purpose opening 44a having the same structure as the above-mentioned fuse cassette block 43, and, on the back surface side thereof that is situated opposed to the projection-purpose opening 44a, an insertion-purpose opening 44b through which the male tab of a cassette bus bar projecting from another adjoining cassette block can be inserted. Further, the relay cassette block 44 further includes, on the insertion-purpose opening 44b side thereof, a securing rib 48 with which another adjoining cassette block can be engaged, and, on the projection-purpose opening 44a side thereof, a lock claw 47 which corresponds to the securing rib 48. Also, in the relay cassette block 44, there is further provided a lock claw 26 which has the same structure as that shown in FIG. 5 and is used to fix the relay cassette block 44 to the block main body.

As shown in FIG. 17, to connect the relay cassette block 44 to the fuse cassette block 43, the relay cassette block 44 may be arranged in contact with the back surface side of the fuse cassette block 43. That is, not only the upper end portion of the lock claw 47 of the relay cassette block 44 is disposed in the lower end portion of the securing rib 46 of the fuse cassette block 43, but also the male tab 57 projecting from the projection-purpose opening 44a of the relay cassette block 44 is disposed in the lower end portion of the insertion-purpose opening 43b of the fuse cassette block 43.

Next, if the relay cassette block 44 is slide upwardly, then the lock claw 47 of the relay cassette block 44 is fit with the securing rib 46 of the fuse cassette block 43 and, at the same time, the male tab 57 of the relay cassette block 44 is fitted into the insertion-purpose opening 43b of the fuse cassette block 43.

In this state, as shown in FIG. 18, the relay cassette block 44 and the fuse cassette block 43 can be connected to each other in an integral manner and, at the same time, the cassette bus bars 53 and 54 thereof can be connected together. Therefore, simply by connecting the male tab 56 of the fuse cassette block 43 to the power source, the series distribution of the power to all the cassette blocks can be realized.

As described above, with use of the cassette blocks 43 and 44 according to the present embodiment, not only two or more kinds of cassette blocks can be connected together in a chained manner but also the cassette bus bars stored within the cassette blocks can be similarly connected together in a chained manner. Therefore, if only the male tab of the cassette block situated in one end portion of a composite cassette block body composed of cassette blocks connected in a chained manner is connected to the power source, then the power can be distributed in series to all the cassette blocks positively and easily, which in turn can simplify an operation to mount the cassette blocks into the block main body.

Figure 19:
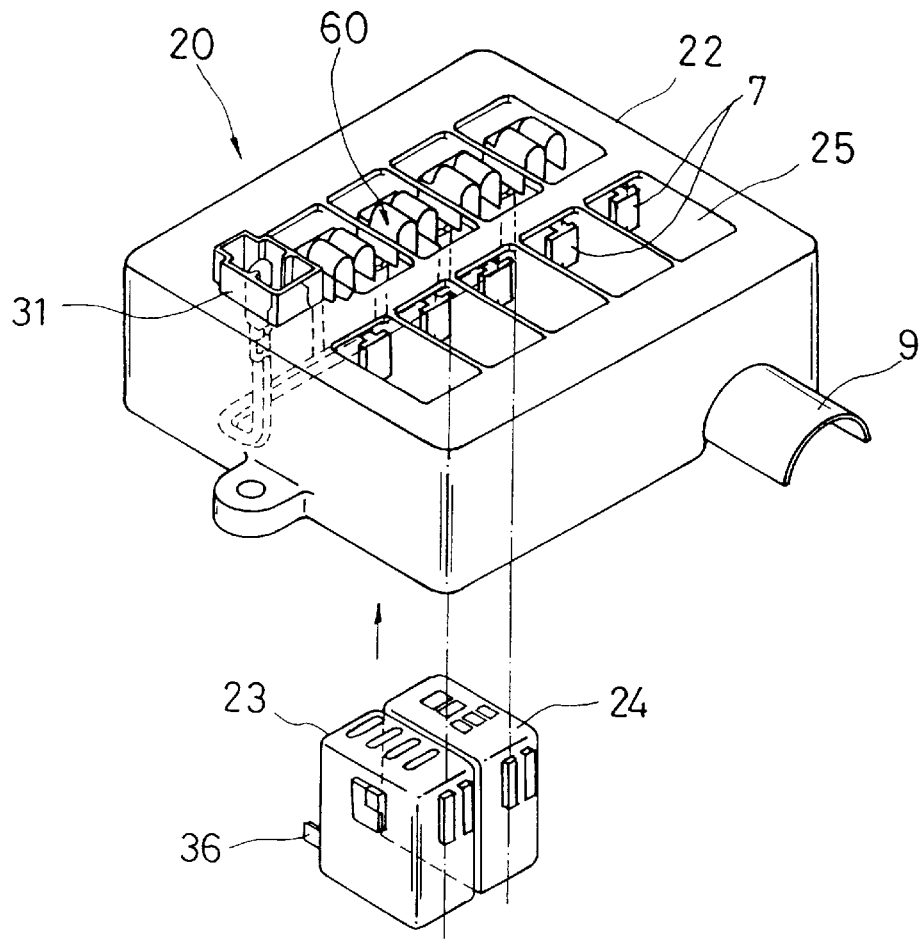
FIG. 19 is an exploded perspective view of a fourth embodiment of the electric wiring block according to the invention.

Next, description will be given below in detail of a fourth embodiment of the electric wiring block according to the invention with reference to FIGS. 19 to 21. Specifically, FIG. 19 is an exploded perspective view of an electric wiring block according to the fourth embodiment, FIG. 20 is a perspective view of the structure of a terminal with an electric wire which is produced as a unit by unifying together a plurality of power distributing terminals to be assembled to the block main body, and FIG. 21 is a partially sectional side view of the structure of the joint portion of the terminal shown in FIG. 20.

Now, an electric wiring block 20 according to the fourth embodiment comprises a block main body 22, which includes a plurality of cassette receiving chambers 25 respectively so formed as to be identical in shape with each other, and various cassette blocks 23 and 24. By the way, in the fourth embodiment, the description of parts having the same structures and operations as those employed in the previously described first and second embodiments is omitted here.

Figure 20:
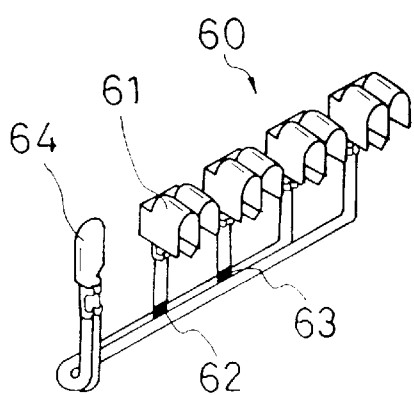
FIG. 20 is a perspective view of the structure of a terminal with an electric wire employed in the electric wiring block shown in FIG. 19.
Figure 21:
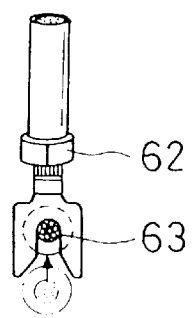
FIG. 21 is a partial sectional side view of the structure of the main portions of the terminal shown in FIG. 20.

In the interior portion of the block main body 22, there is provided such a terminal 60 with an electric wire as shown in FIG. 20, which is formed into a unit by connecting together a plurality of female terminals 61 for power distribution by means of an electric wire 63. The terminal 60 includes in one end thereof the same number of power distributing female terminals 61 as the number of cassette blocks, while such number depends on the vehicle specifications, and, in the other end thereof, a male tab 64 for connection with the power source. A male tab 62 formed in the lower end portion of the female terminal 61 is to be connected to the electric wire 63 of the power source. Since the electric wire 63 is coated with vinyl or the like, the coating of the electric wire 63 is peeled off by a peel-off tool, while the lower end portion 62 of the terminal is clamped using a clamping tool and is then fixed to the portion of the electric wire 63 from which the coating is peeled off. The male tab 62 for connection with the power source is set within a connector portion 31 which is formed in the upper surface of the block main body 22.

If the cassette blocks 23 and/or 24 are inserted into the block main body 22, then the male tabs 36 and/or 37 of bus bars wired within the respective cassette blocks are inserted into the power distributing female terminals 61 and are then connected to the power source. Also, the block main body 22 as well as the cassette blocks 23 and 24 respectively include fixing lock claws 6 and securing ribs 7 which have the same structures as those shown in FIG. 5 and are used to secure these cassette blocks 23 and 24 to the block main body 22.

Therefore, according to the present embodiment, since the number of the terminals connected to the power source through the electric wires can be set properly according to cases, the number of female terminals within the block main body can be easily matched to the necessary number of cassette blocks according to the vehicle specifications. This makes it possible to previously manufacture the connecting terminals. As a result of this, no terminals can be left over afterwards and thus the present embodiment can contribute to saving resources as well as to reduction of production time.

Figure 22:
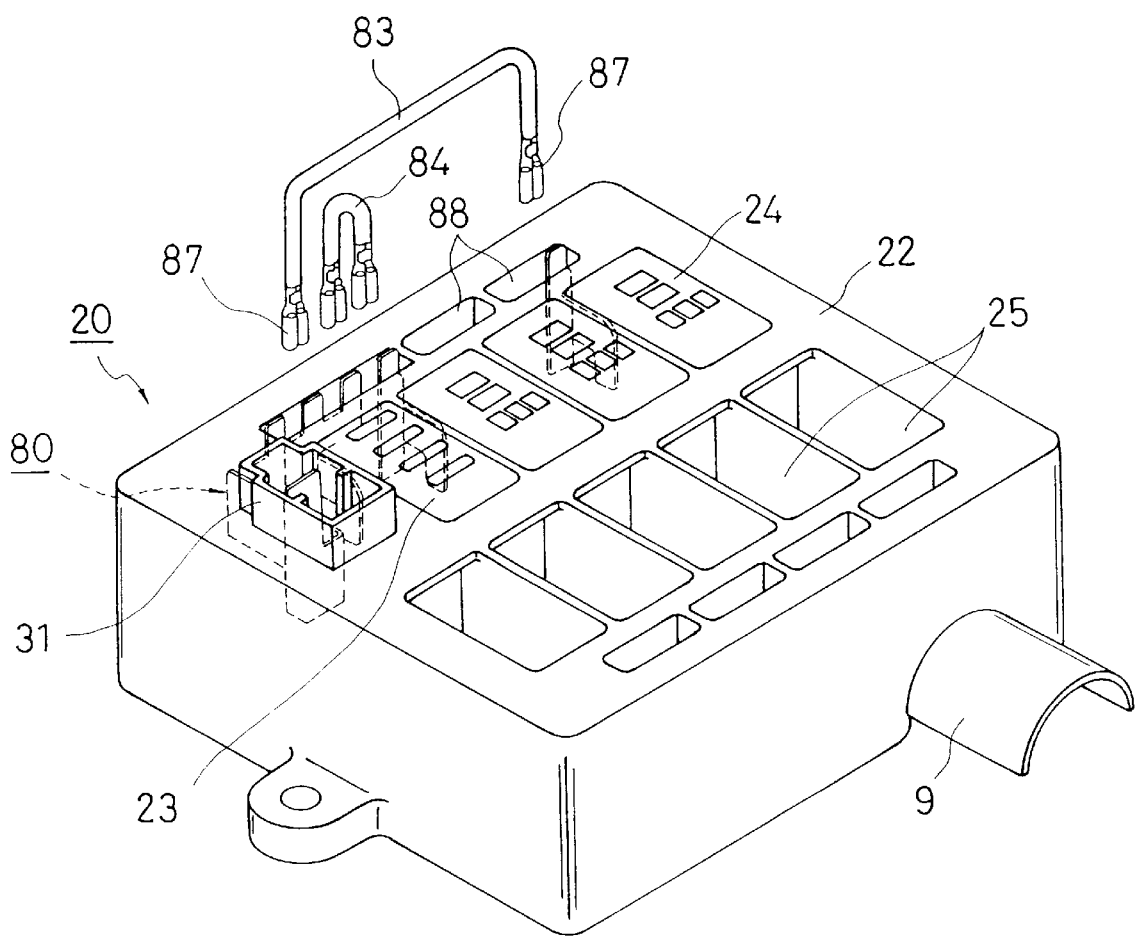
FIG. 22 is an exploded perspective view of a fifth embodiment of the electric wiring block according to the invention.
Figure 23:
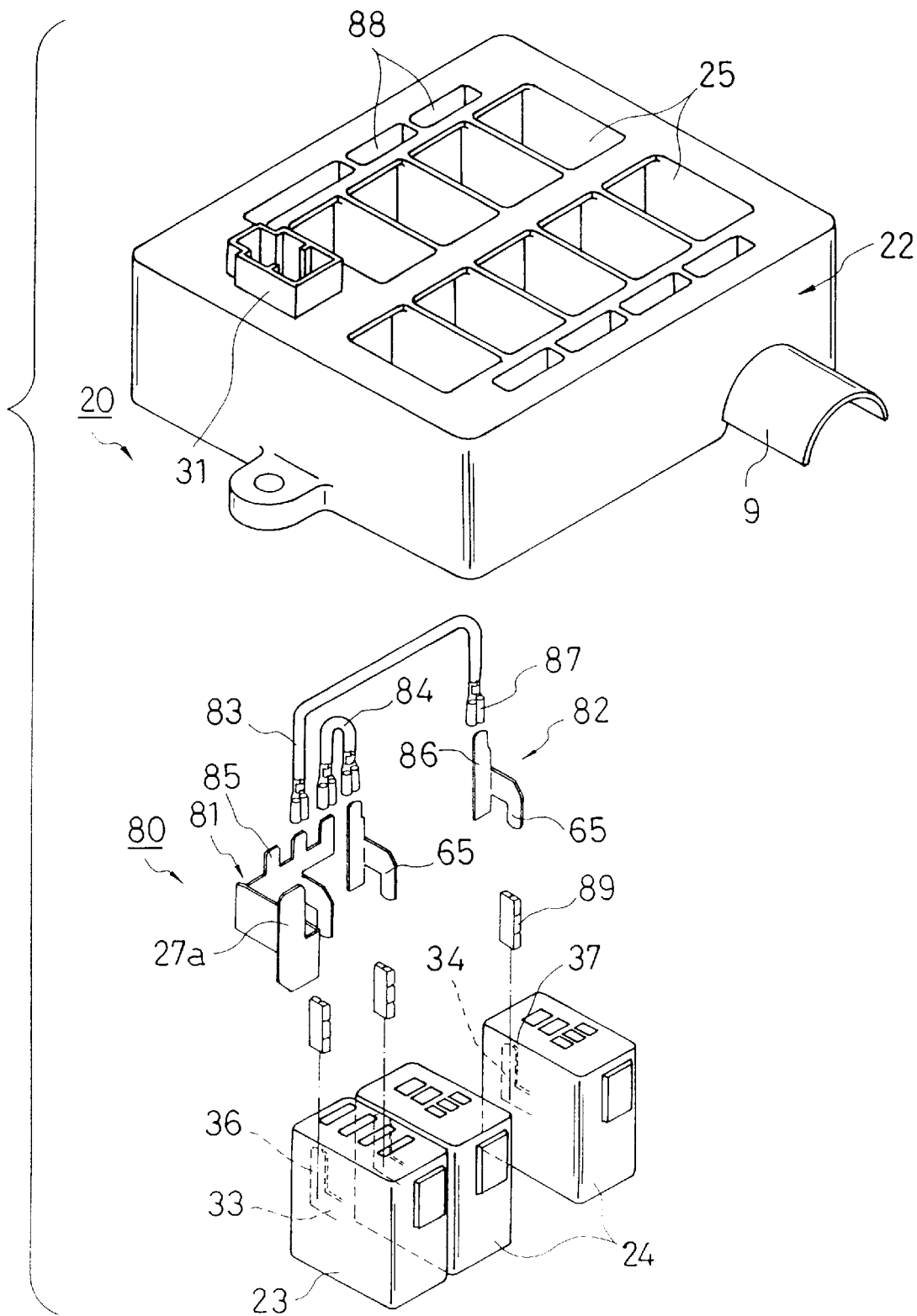
FIG. 23 is an exploded perspective view of a block main body employed in the electric wiring block shown in FIG. 22.

Next, description will be given below in detail of a fifth embodiment of the electric wiring block according to the invention with reference to FIGS. 22 to 23. Specifically, FIG. 22 is a partially exploded perspective view of an electric wiring block according to the fifth embodiment, and FIG. 23 is an exploded perspective view of the electric wiring block according to the fifth embodiment.

Now, the electric wiring block 20 according to the fifth embodiment comprises a block main body 22, which includes therein a plurality of cassette receiving chambers 25 respectively identical in shape with each other, and various cassette blocks 23 and 24. By the way, in the fifth embodiment, the description of parts having the same structures and operations as those employed in the previously described first and second embodiments is omitted here.

The block main body 22 includes a connector portion 31, with which a power supply connector (not shown) can be fitted, and an electric wire take-out hole 9 through which connecting electric wires can be taken out in such a manner that they are tied up in a bundle. The block main body 22 further includes such a power distributing bus bar 80 as shown in FIG. 23. The bus bar 80 is divided into a power source bus bar 81 and a plurality of supply bus bars 82, while the two kinds of bus bars 81 and 82 are connected to each other by means of connecting electric wires 83 and 84.

The power source bus bar 81 is formed as an integral body which includes, in the respective end portions thereof, a male tab 27a to be connected to the power source, a male tab 65 to be connected to a bus bar 33 (or 34) wired within the cassette blocks 23 or 24, and a plurality of male tabs 85 to be connected to the supply bus bars 82, while the power source bus bar 81 is built into the connector portion 31.

Each of the supply bus bars 82 comprises a male tab 65 to be connected to the bus bar wired within each of the cassette blocks, and a male tab 86 to be connected to the power source bus bar 81. While the supply bus bars 82 are incorporated into the cassette receiving chambers 25 respectively. The power source bus bar 81 and supply bus bars 82, in particular, the male tab 85 and male tabs 86 respectively formed therein, are connected to each other through connecting terminals 87 which are provided in the respective end portions of the connecting electric wires 83 (or 84). The male tabs 85 and 86 are respectively received within male tab holes 88 which are formed adjacently to the cassette receiving chambers 25 of the block main body 22.

Connection between the power distributing bus bar 80 and the cassette blocks 23 and 24 can be achieved in such a manner that male tabs 36 and 37 respectively formed in the bus bars 33 and 34 wired within the cassette blocks 23 and 24 are connected to female type terminals 89 previously connected to the male tabs 65 respectively formed in the power source bus bar 81 and supply bus bars 82. By the way, alternatively, the power source bus bar 81 and the bus bars 33 and 34 provided within the cassette blocks 23 and 24 can also be connected directly to each other using the connecting electric wires 83.

Since the present embodiment is structured in the above-mentioned manner, the power source bus bar 81 of the power distributing bus bar 80 is wired within the connector portion 31, the supply bus bars 82, each of which is divided for every pole, are wired within the cassette receiving chambers 25 respectively, and the respective male tabs 85 and 86 of the thus wired supply bus bars 82 and power source bus bar 81 are connected to each other through the connecting electric wires 83 (or 84), thereby establishing a bus bar circuit.

Therefore, according to the present embodiment, since the bus bars to be incorporated into the cassette receiving chambers are divided for every pole and are connected to the power source bus bar 81 through the connecting electric wires 83, the present bus bars can be set in correspondence to the cassette blocks that can be decided in accordance with the vehicle specifications. Due to this, when compared with the conventional electric wiring blocks, there is eliminated the possibility that a waste of bus bars as well as vacant cassette receiving chambers can occur, thereby being able to enhance the wide range of use of the electric wiring block.

Figure 24:
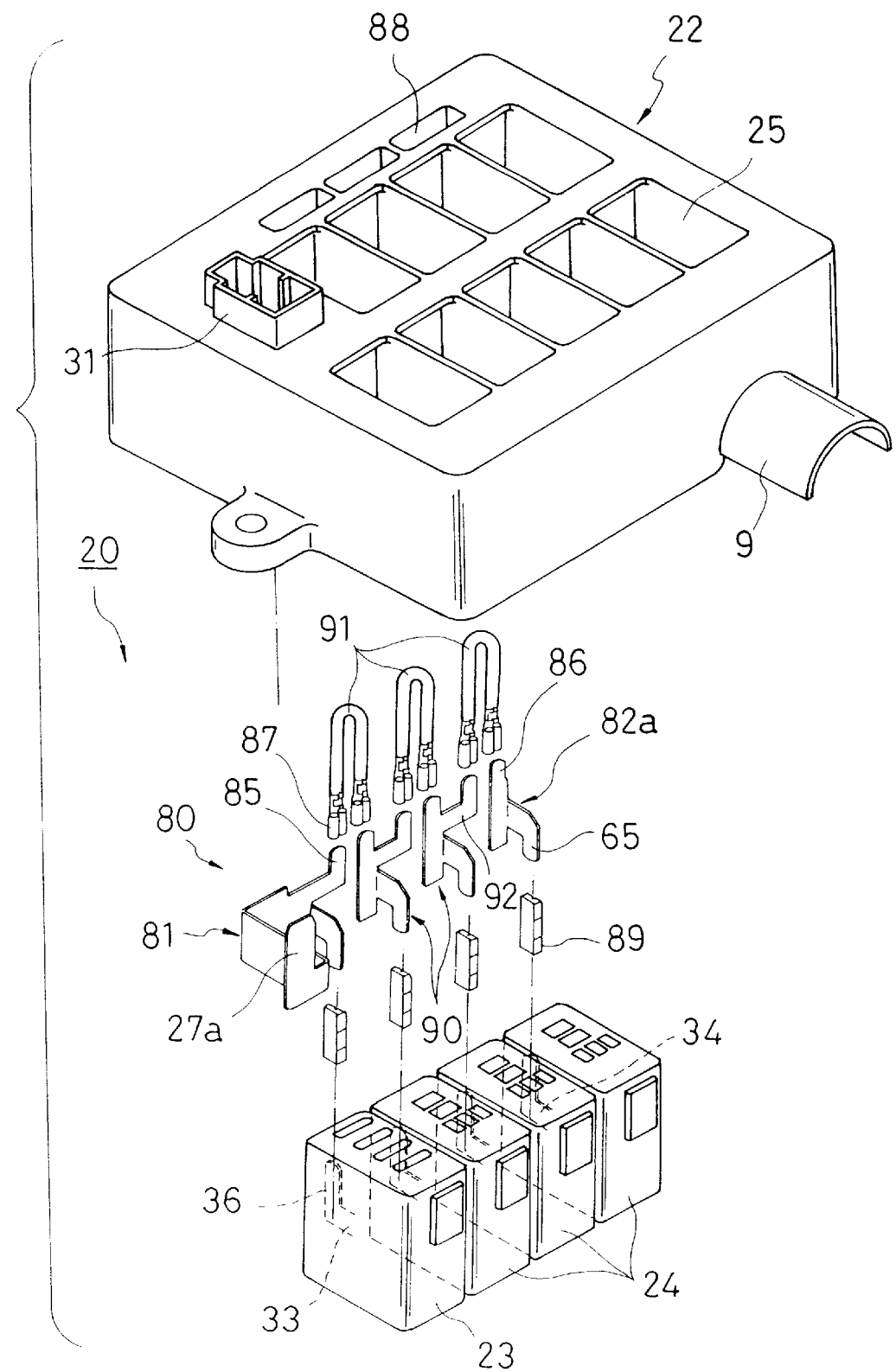
FIG. 24 is an exploded perspective view of a fuse cassette block employed in an electric wiring block according to a sixth embodiment of the invention.

Next, description will be given below in detail of a sixth embodiment of the electric wiring block according to the invention with reference to FIG. 24. Specifically, FIG. 24 is an exploded perspective view of an electric wiring block according to the sixth embodiment.

Now, the electric wiring block 20 according to the sixth embodiment comprises a block main body 22, which includes a plurality of cassette receiving chambers 25 respectively identical in shape with each other, and various cassette blocks 23 and 24. By the way, in the sixth embodiment, the description of parts having the same structures and operations as those employed in the previously described first and second embodiments is omitted here.

The block main body 22 includes a connector portion 31, with which a power supply connector (not shown) can be fitted, and an electric wire take-out hole 9 through which connecting wires can be taken out in such a manner that they are tied up in a bundle. The block main body 22 further includes a power distributing bus bar 80. The bus bar 80 is divided into a power source bus bar 81, an extreme-end terminal bus bar 82, and intermediate bus bars 90 which are wired between the bus bars 81 and 82. The three kinds of bus bars 81, 82 and 90 are connected to each other by means of connecting electric wires 91.

The power source bus bar 81 is formed as an integral body which includes, in the respective end portions thereof, a male tab 27a to be connected to the power source, a male tab 65 to be connected to a bus bar 33 (or 34) wired within the cassette block 23 or 24, and a male tab 85 to be connected to the adjoining intermediate bus bar 90. The terminal bus bar 82 includes a male tab 65 for connection with the bus bars wired within the cassette blocks, and a male tab 86 for connection with the intermediate bus bars 90.

The intermediate bus bars 90 each includes a male tab 65 for connection with bus bars 33 (or 34) respectively wired within the cassette blocks, and a male tab 86 for receiving the power source, and a male tab 92 for transmission of the power source. Connection between the above-mentioned bus bars 81, 82 and 90 can be achieved in the following manner: that is, to connect the power source bus bar 81 and its adjoining intermediate bus bar 90 to each other, connecting terminals 87 provided in the respective end portions of connecting electric wires 91 may be connected to the male tabs 85 and 86 respectively formed in the bus bars 81 and 90.

Also, to connect the two mutually adjoining intermediate bus bars 90 and 90 to each other, the connecting terminals 87 provided in the respective end portions of connecting electric wires 91 may be connected to the male tab 92 for power transmission and tab 86 for power reception. Further, to connect the intermediate bus bar 90 to the terminal bus bar 82 adjoining the present intermediate bus bar 90, the male tab 86 for power reception of the present terminal bus bar and the male tab 92 for power transmission of the intermediate bus bar 90 may be respectively connected to the connecting terminals 87 provided in the respective end portions of connecting electric wires 91. The male tabs 85 and 86 are respectively stored into male tab holes 88 which are formed adjacent to the cassette receiving chambers 25 of the block main body 22. To connect the power distributing bus bar 80 to the cassette blocks 23 and 24, male tabs 36 and 37 respectively formed in bus bars 33 and 34 wired within the cassette blocks 23 and 24 may be connected to female type terminals 89 which are previously connected to the respective male tabs 65 on the bus bar side.

Due to the fact that the present embodiment is structured in the above-mentioned manner, the number of the intermediate bus bars 90, out of the power distributing bus bar 80, can be set freely or can be increased or decreased. Also, since each of the present intermediate bus bars includes the power reception male tab 86 and power transmission male tab 92, the connection of the intermediate bus bars 90 to the power source bus bar 81 and terminal bus bar 82 as well as the connection of one intermediate bus bar 90 to its adjoining intermediate bus bar 90 can be achieved easily through the connecting electric wires 91 and, at the same time, the manner of connection by means of the connecting electric wires 91 can be changed variously according to the vehicle specifications. Further, since the present connecting electric wires 91 are used for connection between the mutually adjoining bus bars, the required length of the connecting electric wires 91 can be reduced down to a minimum.

Therefore, according to the present embodiment, since the number of the intermediate bus bars 90 that are connected to the power source bus bar 81 through the connecting electric wires 91 can be increased or decreased as the need arises, it is possible to set accurately not only the number of the intermediate bus bars 90 that are incorporated into the receiving chambers according to the number of the cassette blocks variable depending on the vehicle specifications, but also the number of the receiving chamber or terminal bus bar 82. This can prevent not only the possibility that a receiving chamber with an unnecessary bus bar built thereinto cannot be used and thus can be left vacant, but also the possibility that a bus bar can be left unused to thereby waste an investment for the facilities.

Figure 25:
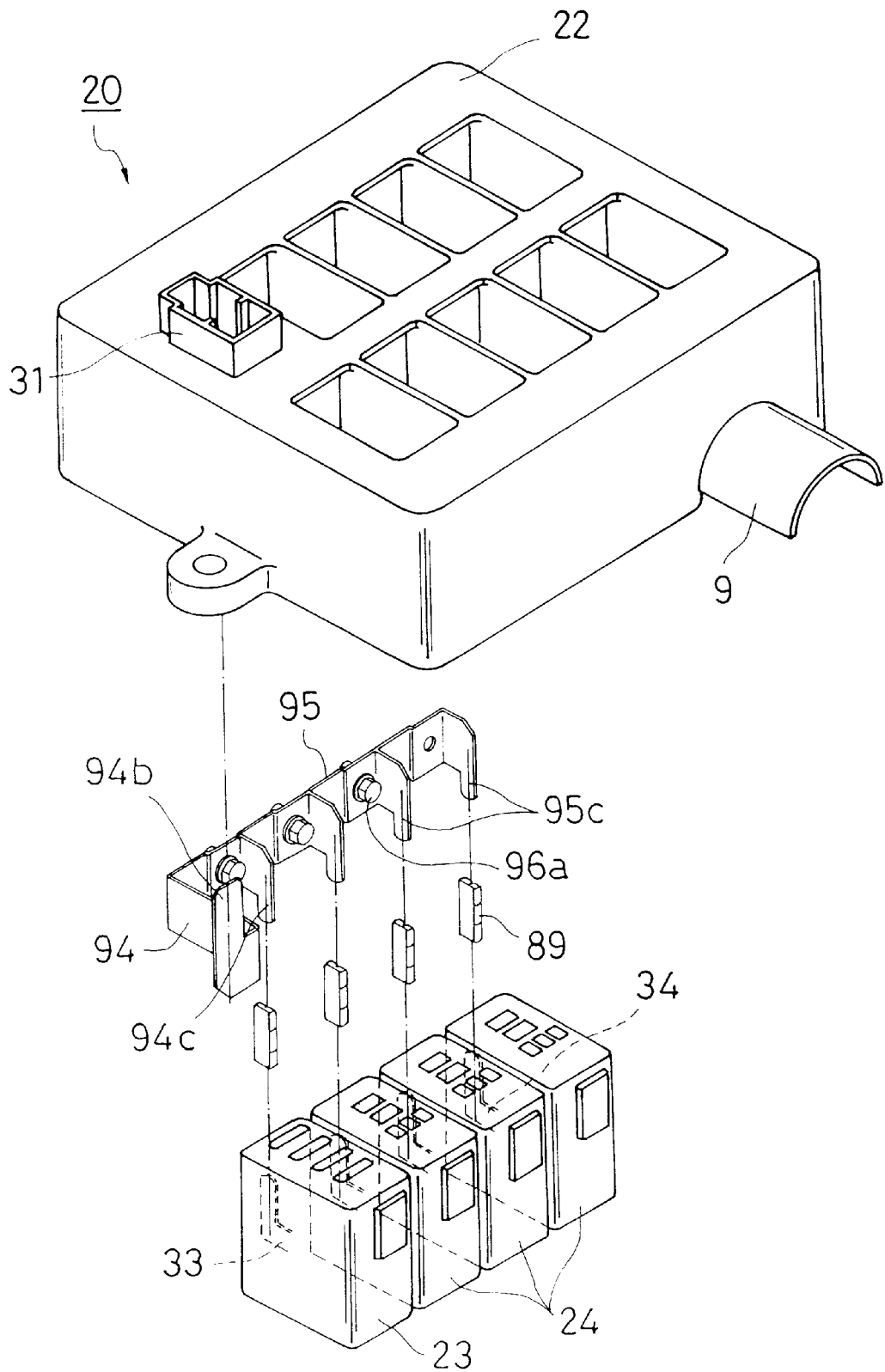
FIG. 25 is an exploded perspective view of a seventh embodiment of the electric wiring block according to the invention.
Figure 26:
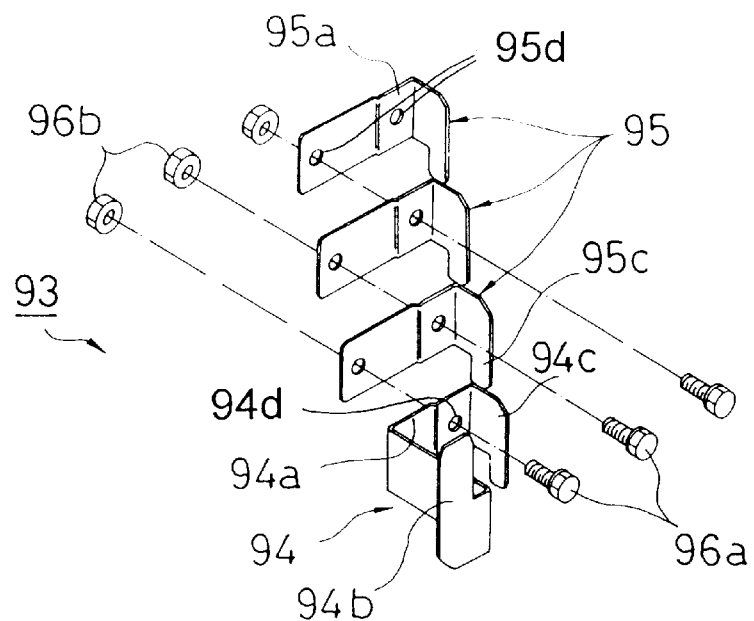
FIG. 26 is an exploded perspective view of a power distributing bus bar employed in the electric wiring block shown in FIG. 25.

Next, description will be given below in detail of a seventh embodiment of the electric wiring block according to the invention with reference to FIGS. 25 and 26. Specifically, FIG. 25 is an exploded perspective view of an electric wiring block according to the seventh embodiment, and FIG. 26 is an exploded perspective view of the main portions of the electric wiring block according to the seventh embodiment.

Now, the electric wiring block 20 according to the seventh embodiment comprises a block main body 22, which includes a plurality of cassette receiving chambers 25 identical in shape with each other, and various cassette blocks 23 and 24. By the way, in the seventh embodiment, the detailed description of parts having the same structures and operations as those employed in the previously described first and second embodiments is omitted here.

The block main body 22 includes a connector portion 31, with which a power supply connector (not shown) can be fitted, and an electric wire take-out hole 9 through which connecting electric wires can be taken out in such a manner that they are tied up in a bundle. The block main body 22 further includes a power distributing bus bar 93. The bus bar 93 is composed of a single power source bus bar 94, and a plurality of supply bus bars 95 each including a male tab which is used to supply power directly to a single cassette block 23 (or 24).

The power source bus bar 94 is composed of a connecting portion 94a formed in the central portion of the bus bar 94 in a stepped manner, a male tab 94b bent and formed in one end of the bus bar 94 and including an end portion connectable to the power source, and a male tab 94c formed in the other end of the bus bar 94.

Each of the supply bus bars 95 is composed of a connecting portion 95a formed in a stepped manner, and a male tab 95c. The above-mentioned male tabs 94c and 95c are respectively connected to a female type terminal 89, while the male tabs of bus bars 33 and 34 respectively incorporated into the cassette blocks 23 and 24 are also connected to the present female type terminal. At a proper position in the connecting portion 94a of the power source bus bar 94, there is opened up a through-hole 94d and, at proper positions on the two sides of the stepped portion of the connecting portion 95a of the supply bus bar 95, there are opened up through-holes 95d. The power source bus bar 94 and supply bus bars 95 can be fixed to each other in such a manner that their respective connecting portions 94a and 95a are superimposed on each other and, after then, bolts 96a and nuts 96b are inserted through the through-holes 94d and 95d and are then fastened properly with respect to each other.

Since the present embodiment is structured in the above-mentioned manner, the power source bus bar 94 can be wired within the connector portion 31 of the block main body and, at the same time, the supply bus bars 95 can be wired within the cassette receiving chambers 25 into which the cassette blocks 23 and 24 required according to the vehicle specifications are inserted.

Since the supply bus bar 95 according to the present embodiment is divided for every pole, it is easy to set the supply bus bar 95 in accordance with the vehicle specifications. Due to this, according to the present embodiment, when compared with the conventional electric wiring block, there is eliminated the possibility that one or more bus bars can be unused and wasted, thereby being able to enhance the range of wide use of the electric wiring block.

Figure 27:
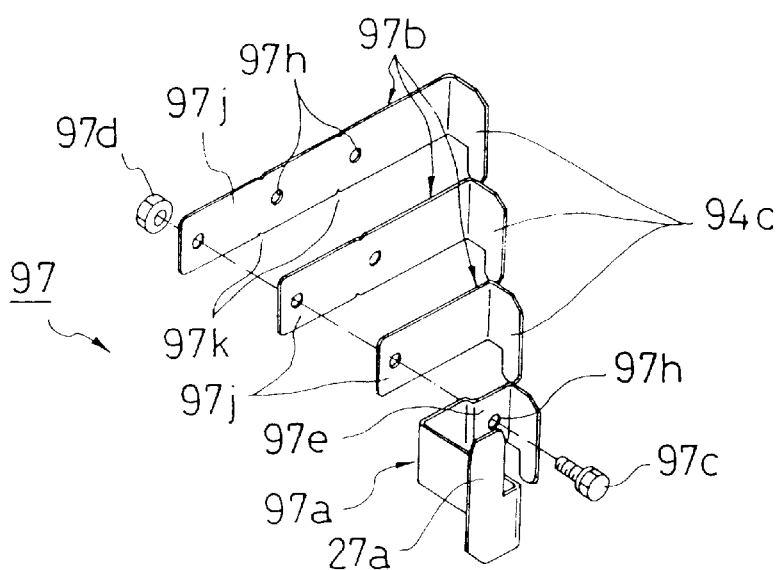
FIG. 27 is an exploded perspective view of a power distributing bus bar employed in an electric wiring block according to an eighth embodiment of the invention.
Figure 28:
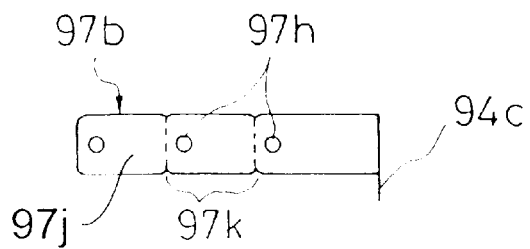
FIG. 28 is a front view of a supply bus bar forming the power distributing bus bar shown in FIG. 27.
Figure 29:
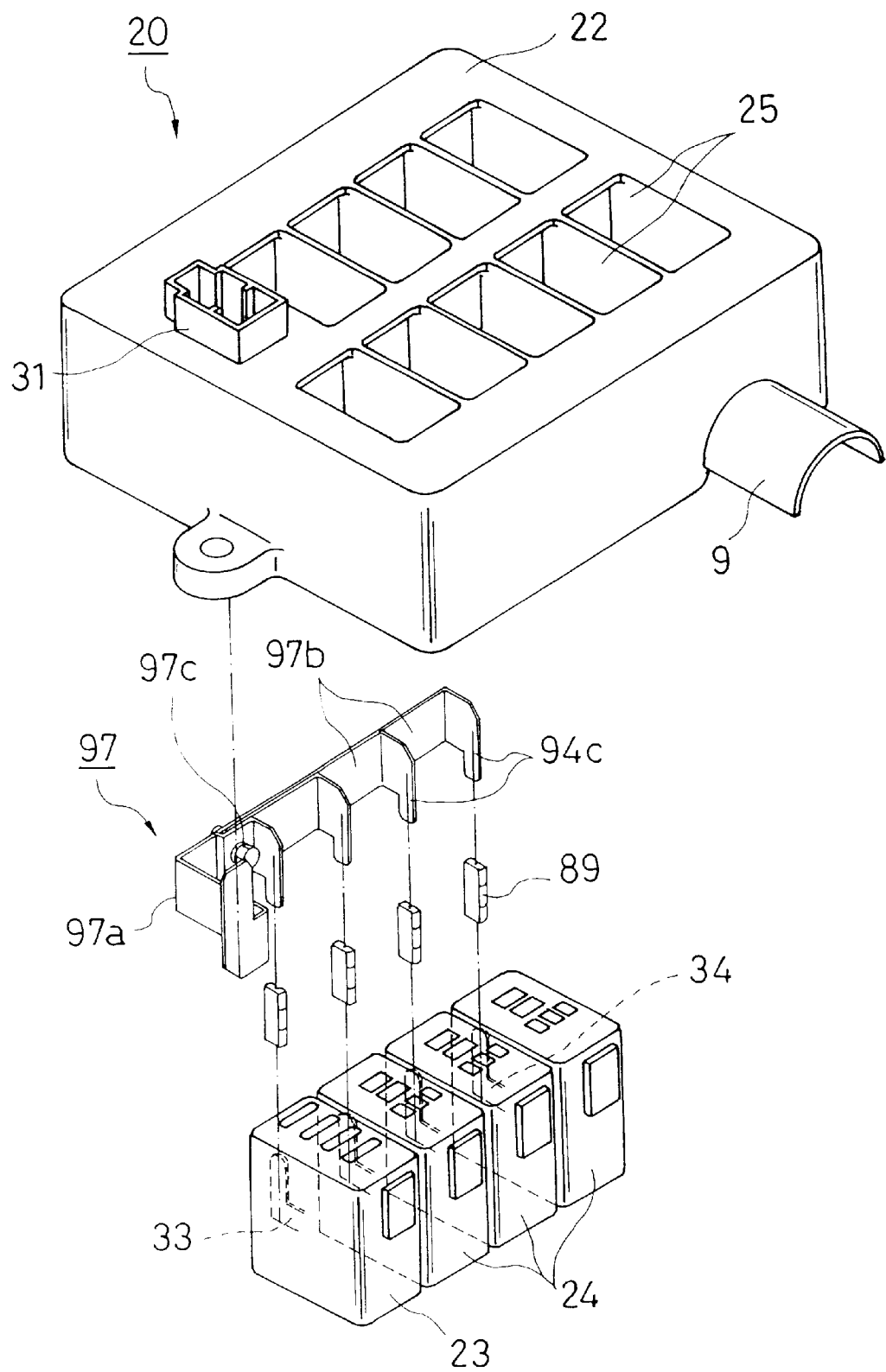
FIG. 29 is an exploded perspective view of an eighth embodiment of the electric wiring block according to the invention.

Next, description will be given below in detail of an eighth embodiment of the electric wiring block according to the invention with reference to FIGS. 27 to 29. Specifically, FIG. 27 is an exploded perspective view of a power distributing bus bar employed in an electric wiring block according to the eighth embodiment, FIG. 28 is a front view of the power distributing bus bar employed in the electric wiring block according to the eighth embodiment, and FIG. 29 is an exploded perspective view of an electric wiring block according to the eighth embodiment.

Now, the electric wiring block 20 according to the eighth embodiment comprises a block main body 22, which includes a plurality of cassette receiving chambers 25 having the same shape, and various cassette blocks 23 and 24. By the way, in the eighth embodiment, the detailed description of parts having the same structures and operations as those employed in the previously described first and second embodiments is omitted here.

The block main body 22 includes a connector portion 31, with which a power supply connector (not shown) can be fitted, and an electric wire take-out hole 9 through which connecting electric wires can be taken out in such a manner that they are tied up in a bundle. The block main body 22 further includes such a power distributing bus bar 97 as shown in FIG. 29. The bus bar 97 is composed of a single power source bus bar 97d, and a plurality of supply bus bars 97b each including a male tab 94c which is used to supply power directly to a single cassette block 23 (or 24).

The power distributing bus bar 97 is composed of a power source bus bar 97a to be connected to a connector (not shown) serving as a power source, and a plurality of distribution bus bars 97b used only to supply the power to the cassette blocks, while the two kinds of bus bars 97a and 97b are assembled together by a bolt 97c and a nut 97d.

Also, the power source bus bar 97a is composed of a mounting portion 97e which is formed in a stepped manner and in which there is opened up a bolt insertion through-hole 97h at a proper position, a male tab 27a formed in one end of the mounting portion 97e and connectable to the connector, and a male tab 94c formed in the other end of the mounting portion 97e and connectable through the female type terminal 89 to the bus bars 33 and 34 wired within the cassette blocks. The distribution bus bar 97b is composed of a flat-plane-shaped mounting portion 97j and a male tab 94c to be connected to the bus bar wired within the cassette block.

The mounting portion 97j (see FIG. 28) of the distribution bus bar 97b, in the blank material state thereof, includes a plurality of cut portions 97k and a plurality of bolt insertion through-holes 97h at proper positions in the two side edges thereof. Due to this structure, by cutting the cut portions 97k at proper positions according to the vehicle specifications, it is possible to produce distribution bus bars 97b in which the mounting portions 97j are different in length from each other.

As the present embodiment is structured in the above-mentioned manner, the power source bus bar 97a can be wired within the connector portion 31 of the block main body 22 and, at the same time, the distribution bus bars 97b differing in length from each other and corresponding to the respective cassette blocks can be superimposed on top of each other and can be fixed by the single bolt 97c which is to be inserted through the bolt insertion through-hole 97h. Due to this, the distribution bus bars 97b can be wired within the cassette receiving chambers 25 corresponding to the cassette blocks 23 and 24 which are to be inserted according the vehicle specifications.

Thus, since the distribution bus bars 97b according to the present embodiment are respectively divided for every pole, they can be set easily in accordance with the vehicle specifications. As a result of this, the electric wiring block according to the present embodiment, when compared with the conventional electric wiring blocks in which the wired bus bars can be of no use and thus are wasted, is able to cope with any types of vehicle specifications, so that the general-purpose characteristic of the present electric wiring block can be enhanced.

Figure 30:
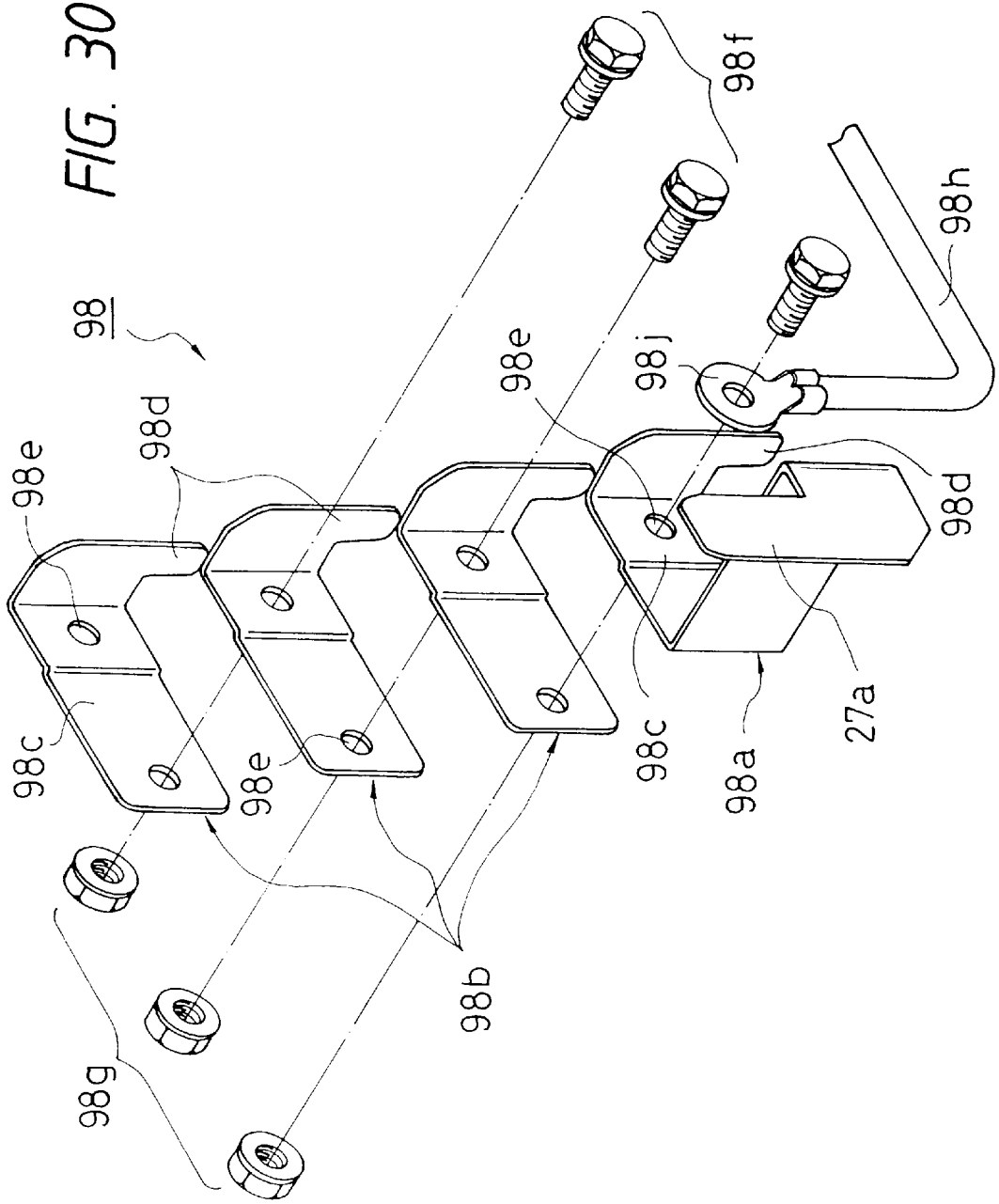
FIG. 30 is an exploded perspective view of a power distributing bus bar employed in an electric wiring block according to a ninth embodiment of the invention.

Next, description will be given below in detail of a ninth embodiment of the electric wiring block according to the invention with reference to FIG. 30. Specifically, FIG. 30 is an exploded perspective view of a power distributing bus bar employed in an electric wiring block according to the ninth embodiment.

The power distributing bus bar 98 according to the present embodiment is wired within the block main body of the electric wiring block (not shown) and is connected to the bus bars of various cassette blocks to be inserted into a plurality of cassette receiving chambers which are formed in the block main body and are identical in shape with each other. By the way, in the ninth embodiment, the detailed description of parts having the same structures and operations as those employed in the previously described first and second embodiments is omitted here.

The above-mentioned power distributing bus bar 98 is composed of a single power source bus bar 98a and a plurality of distribution bus bars 98b which have the same shape and are respectively used to supply the power directly to various cassette blocks formed separately from each other.

The power source bus bar 98a is composed of a mounting portion 98c which is formed in a stepped manner and in which there is opened up a through-hole 98e at a proper position, a male tab 27a formed in one end of the power source bus bar 98a and connectable to a connector (not shown) to receive the power source, and a male tab 98d formed in the other end of the power source bus bar 98a and connectable to the cassette blocks which are to be inserted into the cassette receiving chambers.

Also, each the distribution bus bar 98b is composed of a mounting portion 98c, which is formed in a stepped manner and there are opened up two through-holes 98e and 98e at proper positions, and a male tab 98d which is formed in the other end of the distribution bus bar 98b and can be connected to the cassette blocks inserted into the cassette receiving chambers.

To fix the power source bus bar 98a and its adjoining distribution bus bar 98b to each other, the respective mounting portions 98c thereof may be superimposed on top of each other, a bolt 98f may be inserted through the respective through-holes 98c thereof which are coincident in position with each other, and then the bolt 98f may be fastened by a nut 98g. To fix the thus fixed distribution bus bar 98b and its adjoining distribution bus bar 98b to each other, similarly to the above case, the respective mounting portions 98c thereof may be superimposed on top of each other, a bolt 98f may be inserted through the respective through-holes 98e thereof which are coincident in position with each other, and then the bolt 98f may be fastened by a nut 98g.

After the distribution bus bar 98b is fixed to the power source bus bar 98a in the above-mentioned manner, other adjoining distribution bus bars 98b can be fixed in number as many as required.

Further, a round terminal 98j is fixed to the mounting portion 98c of the power source bus bar. The round terminal 98j is to be fixed to the end portion of an electric wire 98h for another circuit by a bolt 98f which is inserted in order to connect the distribution bus bar 98b to the power source bus bar 98a.

Since the present embodiment is structured in the above-mentioned manner, after the power source bus bar 98a and its adjoining distribution bus bar 98b including a male tab 98d for one pole connection are fixed to each other, if other adjoining distribution bus bars 98b are fixed sequentially and thus a plurality of distribution bus bars 98b are superimposed on top of each other, then the power distributing bus bars 98, which respectively correspond to the cassette blocks 23 and 24 to be inserted into the cassette receiving chambers 25 according to the vehicle specifications, can be wired within the cassette receiving chambers 25.

As described above, since the distribution bus bars 98b according to the present embodiment are respectively divided for every pole, they can be set easily according to the vehicle specifications. Due to this, in the electric wiring block according to the present embodiment, there is eliminated the possibility as in the conventional block that the wired bus bars can be of no use and thus can be wasted. That is, the present electric wiring block is able to cope with any types of vehicle specifications, thereby being able to enhance its general-purpose characteristic. Further, since the round terminal 98j of the electric wire 98h for another circuit can be connected to the mounting portion 98c of the power source bus bar 98a, the application range of the present electric wiring block can be widened.

Figure 31:
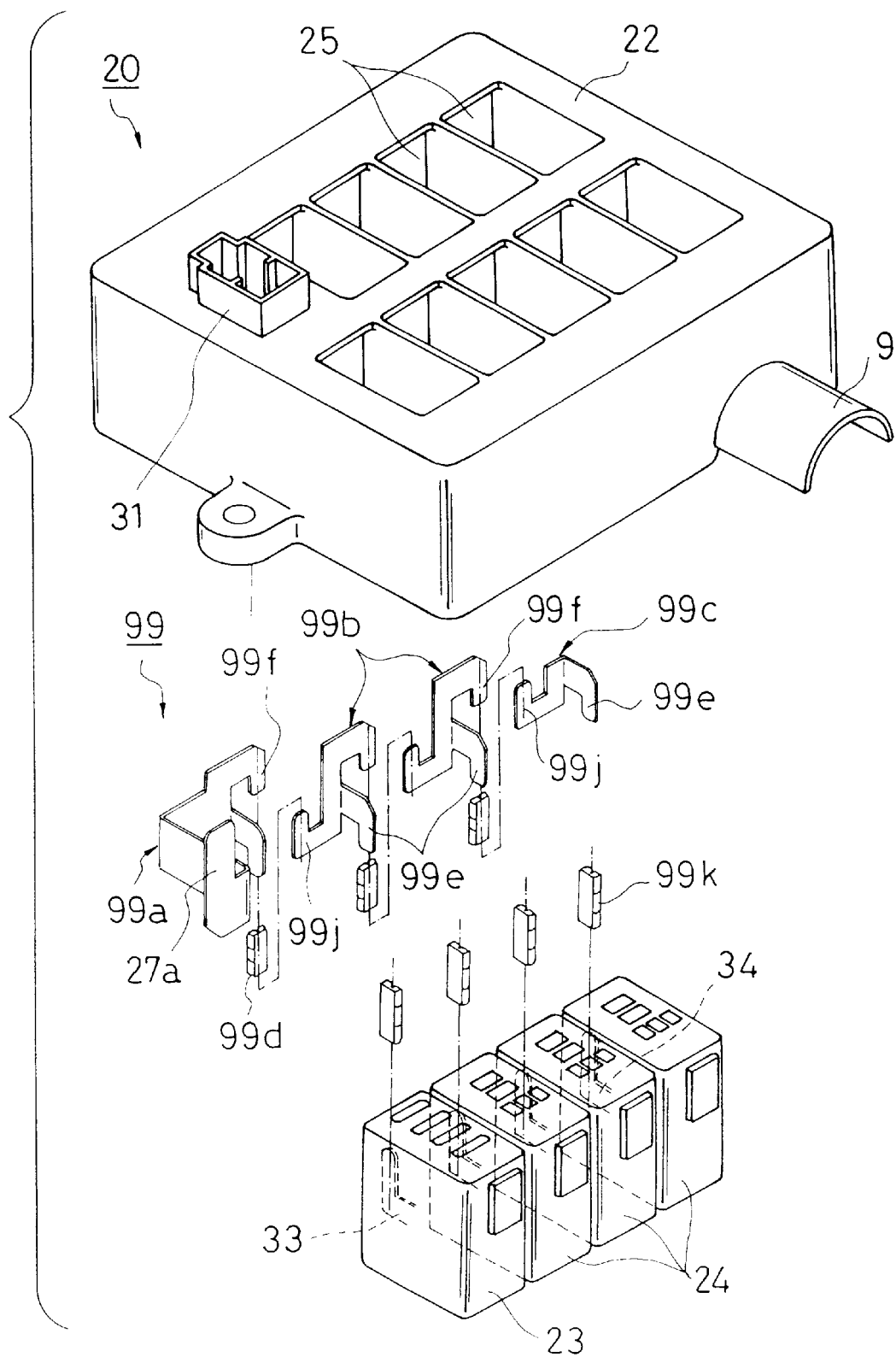
FIG. 31 is an exploded perspective view of a tenth embodiment of the electric wiring block according to the invention.

Next, description will be given below in detail of a tenth embodiment of the electric wiring block according to the invention with reference to FIG. 31. Specifically, FIG. 31 is an exploded perspective view of an electric wiring block according to the tenth embodiment.

Now, the electric wiring block 20 according to the tenth embodiment comprises a block main body 22, which includes a plurality of cassette receiving chambers 25 identical in shape with each other, and various cassette blocks 23 and 24. By the way, in the tenth embodiment, the detailed description of parts having the same structures and operations as those employed in the previously described first and second embodiments is omitted here.

The block main body 22 includes a connector portion 31, with which a power supply connector (not shown) can be fitted, and an electric wire take-out hole 9 through which connecting wires can be taken out in such a manner that they are tied up in a bundle. The block main body 22 further includes a power distributing bus bar 99. The bus bar 99 is divided into a single power source bus bar 99a, a plurality of intermediate bus bars 99b each including a male tab to supply the power directly to the cassette blocks 23 or 24 which are formed separately from each other, and an terminal bus bar 99c to be wired at a position most distant from the power source bus bar 99a, while the three kinds of bus bars 99a, 99b and 99c are connected to each other by means of female type terminals 99d.

The power source bus bar 99a is formed as an integral body which includes, in the respective end portions thereof, a male tab 27a to be connected to the connector of the power source, a male tab 99e to be connected to a bus bar 33 (or 34) wired within the cassette blocks 23 or 24 through a female type terminal 99k, and a male tab 99f to be connected to its adjoining intermediate bus bar 99b through a female type terminal 99d.

Also, the intermediate bus bar 99b is formed as an integral body which includes, in the respective end portions thereof, a male tab 99e to be connected through a female type terminal 99k to the bus bar 33 or 34 wired within the cassette block 23 or 24, a male tab 99j to be connected through a female type terminal 99d to the power source bus bar 99a or to an intermediate bus bar 99b which adjoins the present intermediate bus bar 99b on the power source bus bar side, and a male tab 99f to be connected through a female type terminal 99d to the terminal bus bar 99c or to an intermediate bus bar 99b which adjoins the present intermediate bus bar 99b on the terminal bus bar 99c side.

Further, the terminal bus bar 99c is formed as an integral body which includes, in the respective end portions thereof, a male tab 99j to be connected through a female type terminal 99d to its adjoining intermediate bus bar 99d, and a male tab 99e to be connected through a female terminal 99k to the bus bar 33 or 34 wired within the cassette block 23 or 24.

As the present embodiment is structured in the above-mentioned manner, the number of the intermediate bus bars 99b of the power distributing bus bars 99 to be set can be freely increased and decreased and, at the same time, the intermediate bus bar 99b includes the power receiving side male tab 99j and the power transmitting side male tab 99f. Due to this structure, the connection of the intermediate bus bar 99b not only to the power source bus bar 99a that adjoins the bus bar 99b but also Skis to the terminal bus bar 99c that adjoins on the opposite side thereof can be achieved easily by use of the female type terminals 99d. That is, according to the present embodiment, the number of the intermediate bus bars 99b can be changed variously according to the vehicle specifications.

Therefore, according to the present embodiment, the number of the intermediate bus bars 99b connected to the power source bus bar 99a through the female type terminal 99d can be increased or decreased as the need arises, which makes it possible to set accurately the number of the intermediate bus bars 99b to be built into the cassette receiving chambers 25 in accordance with the number of the cassette blocks 23 and 24 to be inserted, when the number of the cassette blocks 23 and 24 varies according to the vehicle specifications. This can prevent not only the possibility that a receiving chamber with an unnecessary bus bar built thereinto cannot be used and thus can be left vacant, but also the possibility that a bus bar can be left unused to thereby waste an investment for the facilities.

Figure 32:
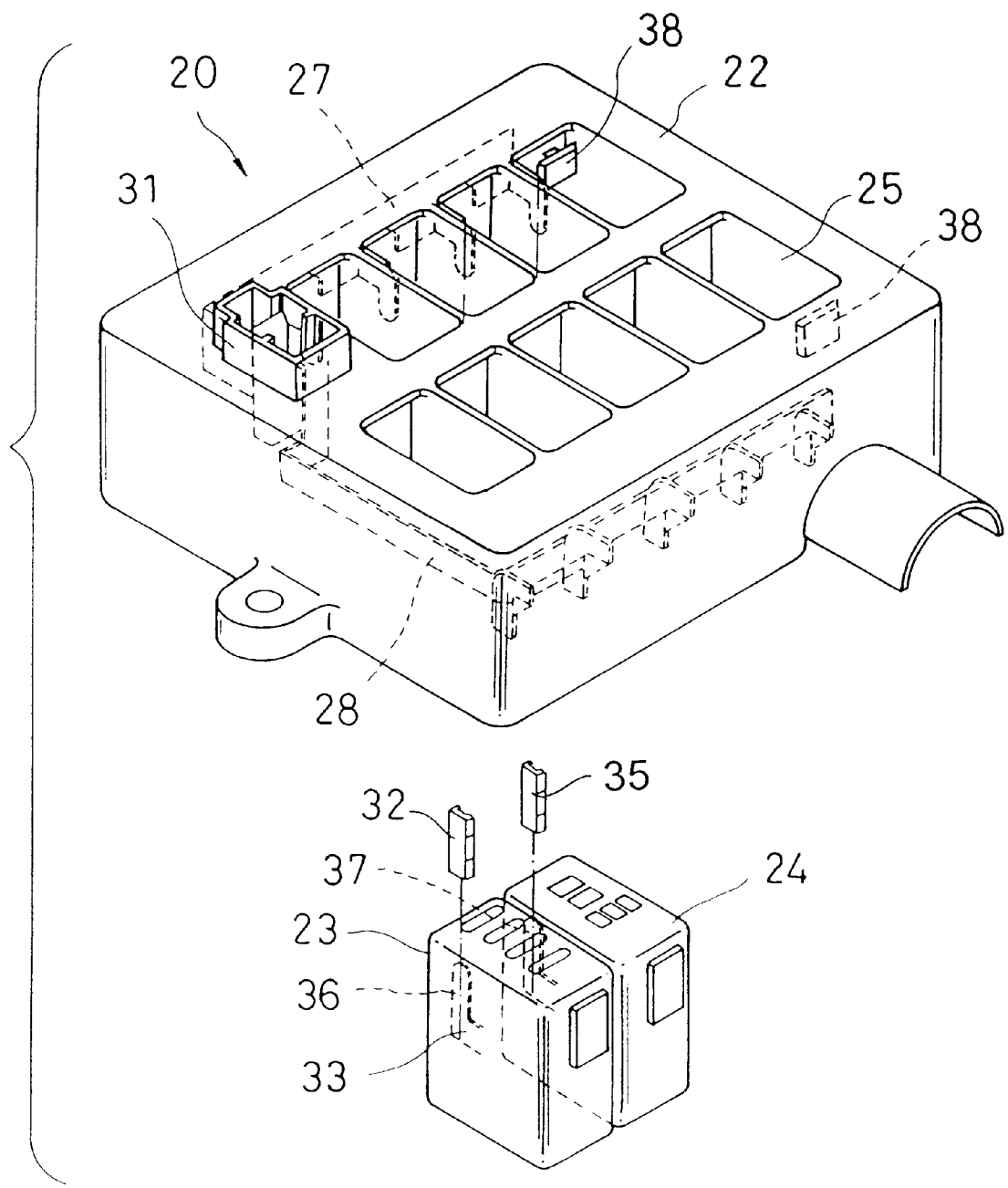
FIG. 32 is an exploded perspective view of an eleventh embodiment of the electric wiring block according to the invention.

Next, description will be given below in detail of a twelfth embodiment of the electric wiring block according to the invention with reference to FIGS. 32 and 33. Specifically, FIG. 32 is an exploded perspective view of an electric wiring block according to the twelfth embodiment, and FIG. 33 is a perspective view of the electric wiring block according to the twelfth embodiment, showing a state thereof in which bus bars are taken out from the block main body thereof.

Now, the electric wiring block 20 according to the twelfth embodiment comprises a block main body 22, which includes a plurality of cassette receiving chambers 25 having the same shape, and various cassette blocks 23 and 24. By the way, in the twelfth embodiment, the detailed description of parts having the same structures and operations as those employed in the previously described first and second embodiments is omitted here.

Figure 33:
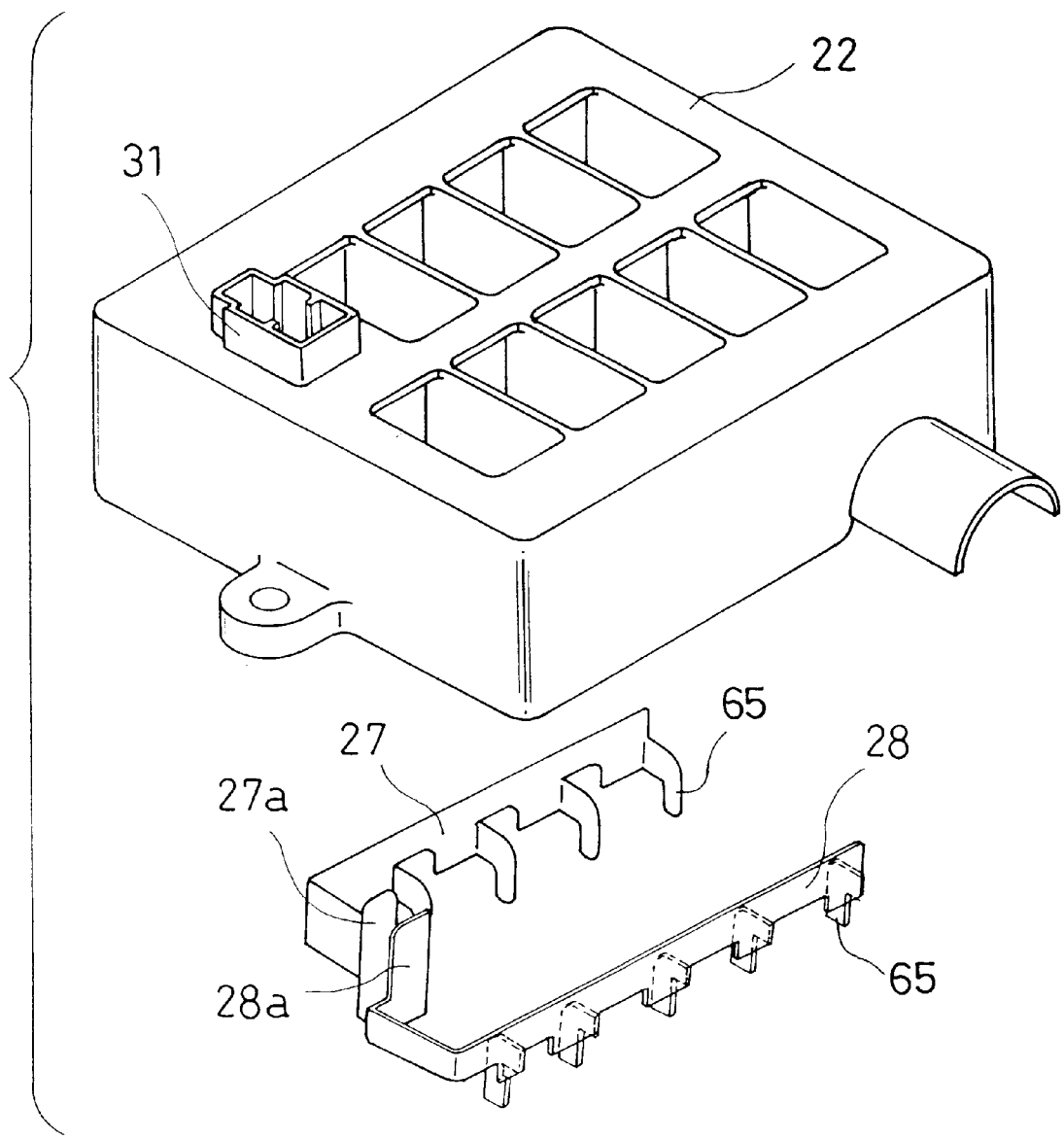
FIG. 33 is an exploded perspective view of a block main body employed in the electric wiring block shown in FIG. 32.

In the interior portion of the block main body 22, there are insert molded such power distributing bus bars 27 and 28 as shown in FIG. 33, while the bus bars 27 and 28 respectively include a plurality of male tabs 65 for power distribution. The power distributing bus bars 27 and 28 respectively include male tabs 27a and 28a in one-side end portions thereof.

Also, in the upper surface of the block main body 22, there is formed a connector portion 31 into which a power supply connector (not shown) is fitted. In the inner peripheral walls of the respective cassette receiving chambers 25, there are formed securing ribs 7 which are identical in structure with those shown in FIG. 5.

Also, as the cassette blocks which are identical in shape with each other and are to be received into the above-mentioned cassette receiving chambers 25, there are set a fuse cassette block 23 into which four pieces of fuses can be mounted, and a relay cassette block 24 into which a single piece of relay can be mounted. In the respective interior portions of the two cassette blocks, there are provided cassette bus bars 33 (or 34) which correspond to the above-mentioned power distributing bus bars 27 and 28 and, in the respective end portions of such cassette bus bars 33 (or 34), there are provided the male tabs 36 (or 37) of the power distributing bus bars 27 and 28.

When the respective tabs 36 and 37 of the bus bars 33 provided within the cassette blocks 23 and 24 are connected to the plurality of power distributing male tabs 65 of the power distributing bus bars 27 and 28 provided within the block main body 22, the female type terminals 32 and 35 are inserted between these two kinds of male tabs.

Therefore, according to the present embodiment, the power distributing connection terminals of the bus bars inserted into the block main body are respectively formed as male tabs, the power receiving connection terminals of the bus bars provided within the cassette blocks are respectively formed as male tabs, and the female type terminals are inserted between these two kinds of male tabs to thereby connect the block main body and cassette blocks electrically, which makes it easy to execute an operation to connect the block main body and cassette blocks to each other. Also, since only such number of female type terminals as corresponds to the number of cassette blocks required in accordance with the vehicle specifications may be used, the bus bars can be simplified in structure and also can be made easy to manufacture.

Figure 34:
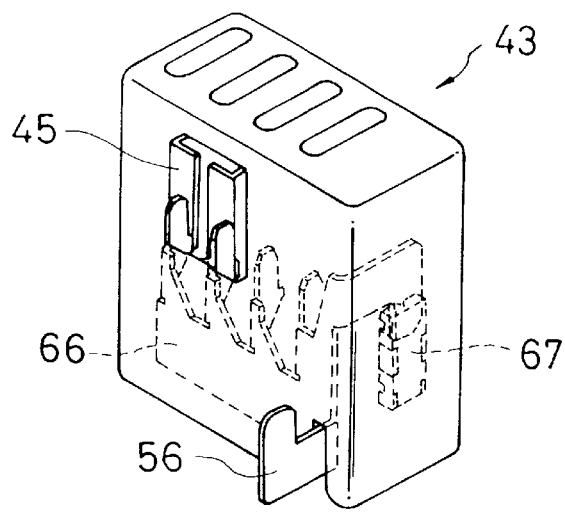
FIG. 34 is a perspective view of the whole of a fuse cassette block employed in an electric wiring block according to a twelfth embodiment of the invention.
Figure 35:
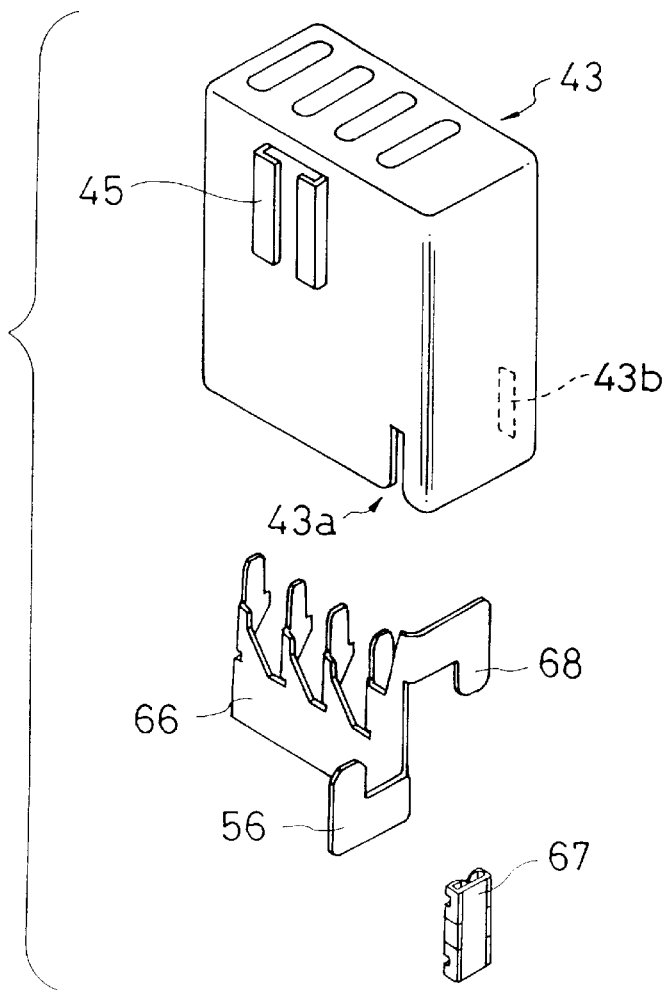
FIG. 35 is an exploded perspective view of the fuse cassette block shown in FIG. 34.

Next, description will be given below of a twelfth embodiment of the electric wiring block according to the invention with reference to FIGS. 34 and 35, which is a partially modified version of the third embodiment which has been previously described herein with reference to FIG. 14. In particular, FIG. 34 is a perspective view of the whole of a fuse cassette block which is to be inserted into an electric wiring block according to the present embodiment, and FIG. 35 is an exploded perspective view of the fuse cassette block shown in FIG. 34. By the way, in the twelfth embodiment, the detailed description of parts having the same structures and operations as those employed in the third embodiment is omitted here.

As shown in FIG. 34, the fuse cassette block 43 according to the present embodiment is structured such that a fuse cassette bus bar 65 including a plurality of male type terminals for fuses is fixed to the interior portion of the fuse cassette block 43, while fuses can be connected to the male type terminals. In the end portion of the fuse cassette bus bar 65, there is formed a male tab 56 which can be connected to the power distributing bus bar. At the position of the fuse cassette bus bar 65 in the opposite direction to the male tab 56, there is formed a male tab 68 for connection of a female type terminal 67 which can be connected to the male tab of an adjoining cassette block.

Also, in the fuse cassette block 43, there are formed a projection-purpose opening 43a through which the male tab 56 can project out, and an insertion-purpose opening (not shown) on the side where the male tab 68 for connection of the female type terminal 67 is formed. That is, when the fuse cassette bus bar 65 is inserted into the fuse cassette block 43, then the male tab 56 projects out from the projection-purpose opening 43a. Further, the fuse cassette block 43 includes, on the insertion-purpose opening side thereof, a securing rib (not shown) serving as a first lock portion for engagement with another adjoining cassette block, and, on the projection-purpose opening 43a side thereof, a lock claw 45 serving as a second lock portion which corresponds to the above-mentioned securing rib.

Still further, the fuse cassette block 43 includes another lock claw (not shown) which has the same structure as that shown in FIG. 5 and is used to fix the block main body.

As described above, the present embodiment is characterized in that the connecting terminal of the bus bar fixed to the interior portion of the cassette block, which is used for connection to an adjoining cassette block, is formed as a male tab, and a female terminal is connected to the present male tab to thereby allow the present cassette block to be connected to the adjoining cassette block. Therefore, by simplifying the shape of the bus bar within the cassette block, the cassette block can be simplified in structure and also can be made easy to manufacture.

Figure 36:
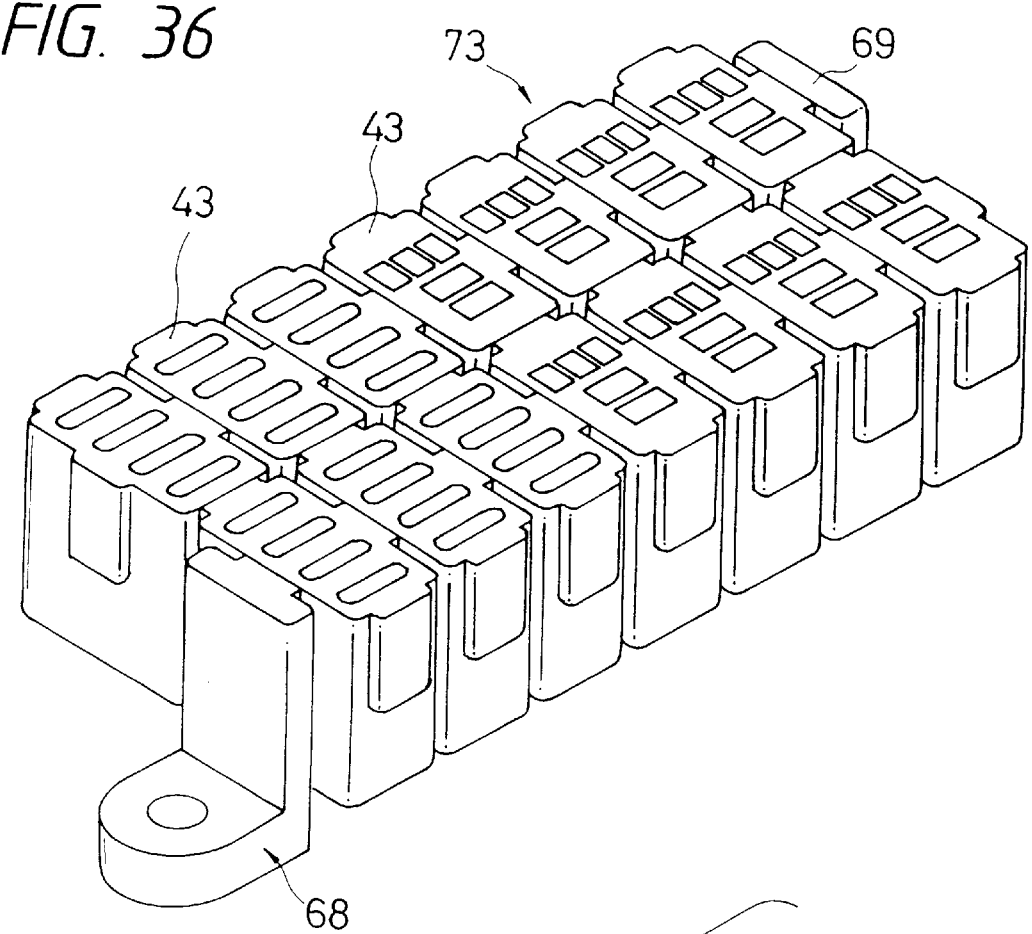
FIG. 36 is a perspective view of the whole of a thirteenth embodiment of the electric wiring block according to the invention.
Figure 37:
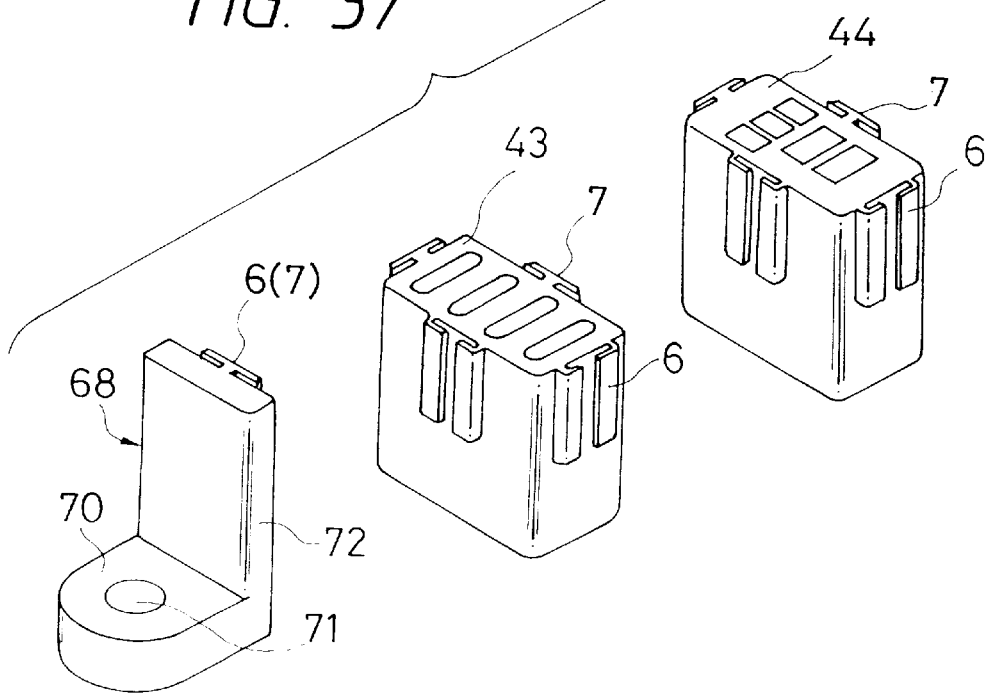
FIG. 37 is an exploded perspective view of cassette blocks and a mounting portion employed in the electric wiring block shown in FIG. 36.
Figure 38:
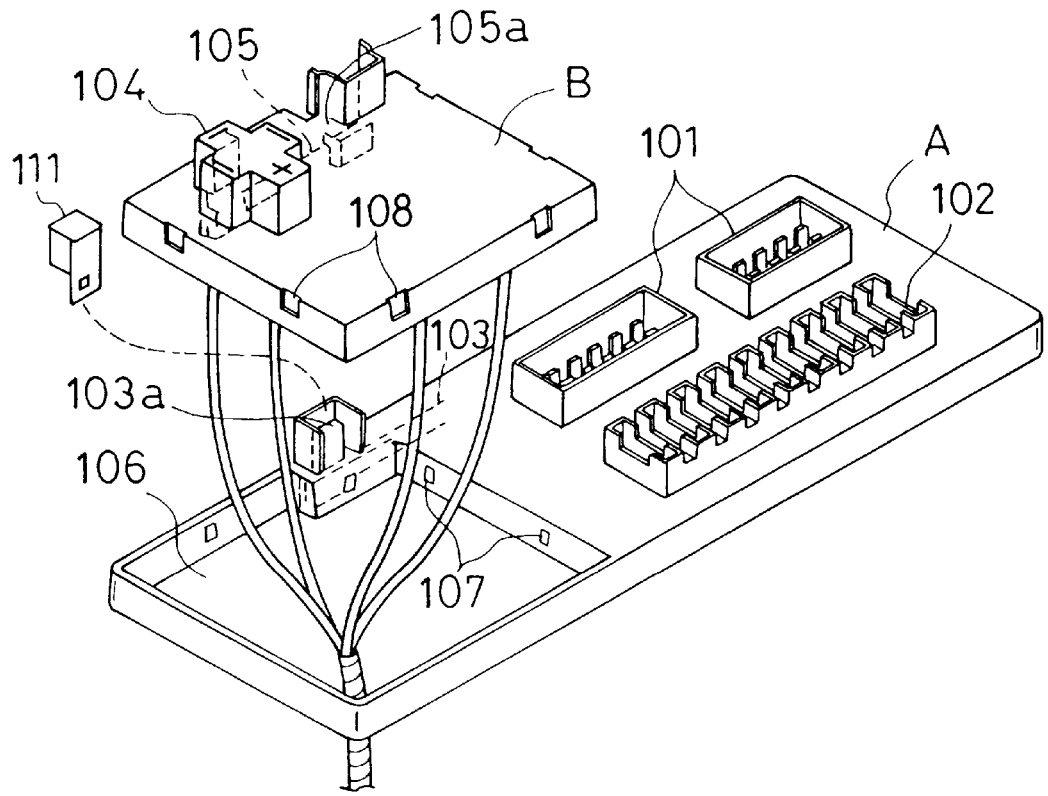
FIG. 38 is an exploded perspective view of a conventional electric wiring block.
Figure 39:
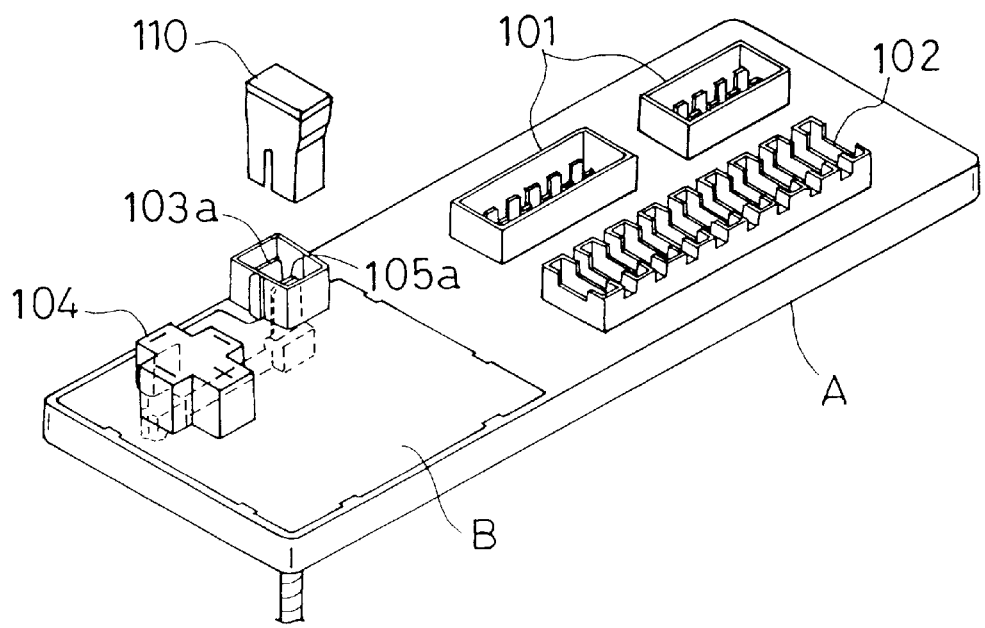
FIG. 39 is a perspective view of the conventional electric wiring block shown in FIG. 38, showing a state thereof in which the assembly thereof is completed.
Figure 40:
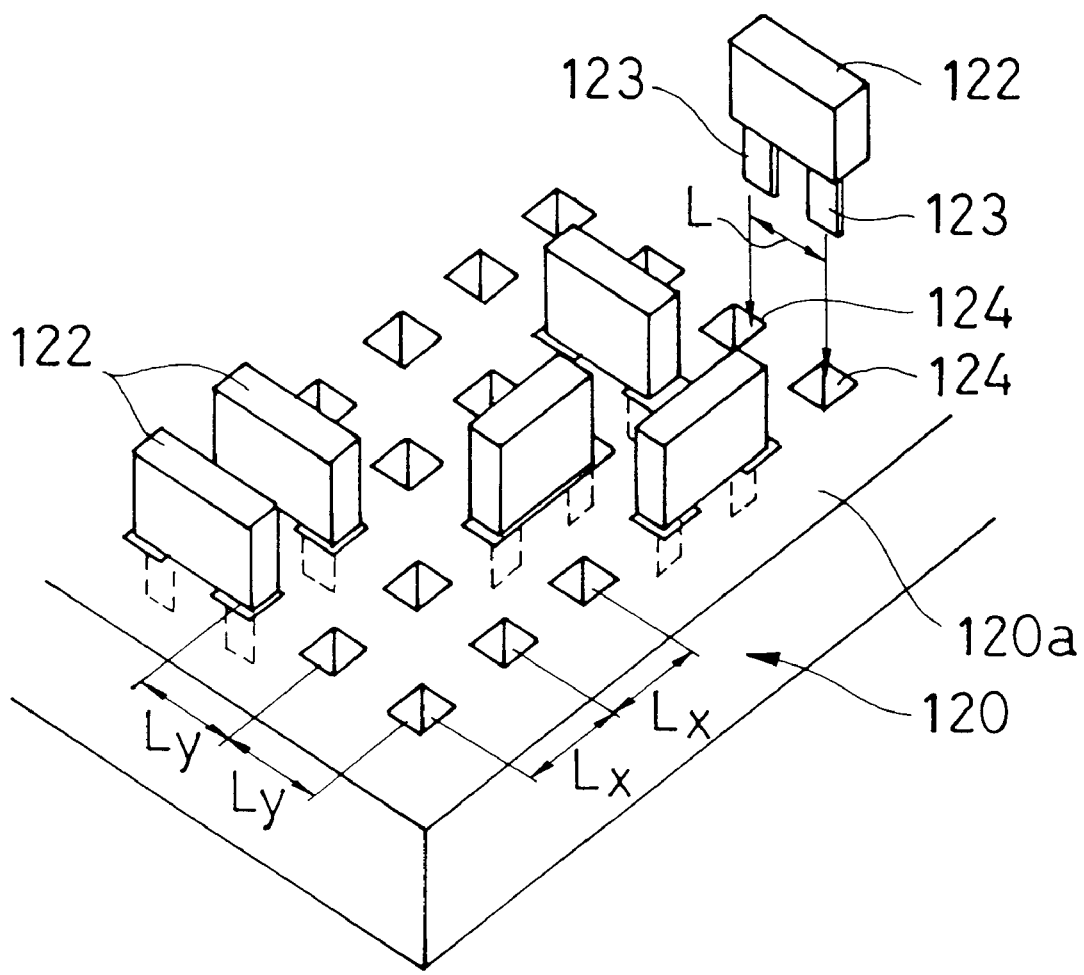
FIG. 40 is an exploded perspective view of another conventional electric wiring block.

Next, description will be given below of a thirteenth embodiment of the electric wiring block according to the invention with reference to FIGS. 36 and 37. In particular, FIG. 36 is a perspective view of the whole of an electric wiring block according to the thirteenth embodiment, and FIG. 37 is a perspective view of the main portions of the electric wiring block according to the thirteenth embodiment, showing a state thereof in which cassette blocks and their mounding portions thereof are exploded. In the present embodiment, similarly to the third embodiment that has been described with reference to FIGS. 14 and 16, a fuse cassette block 43 and a relay cassette block 44 respectively include, on their respective four side surfaces, lock claws 6 or securing ribs 7 which have been previously described with reference to FIG. 5.

With use of this structure, since the respective cassette blocks 43 and 44 can be engaged with each other by means of the above-mentioned lock claws 6 and securing ribs 7 that are respectively provided on their adjoining surfaces, only the proper number of the cassette blocks 43 and 44 can be combined together in accordance with the vehicle specifications. An electric wiring block 73, which is composed of the thus combined cassette blocks, can be fixed at a given position by mounting bodies 68 and 69 which are respectively disposed on the two sides of the electric wiring block 73 and also include the lock claws 6 and 45 or securing ribs 7 and 46 similar in shape to those provided on the side surfaces of the cassette blocks 43 and 44. Each of the mounting bodies 68 is formed in an L shape, includes a horizontal portion 70 having a mounting hole 71 therein, is mounted on a platform by a bolt (not shown) which is inserted through the mounting hole 71, and further includes the above-mentioned lock claws 45 or securing ribs 46 on the side surface of a vertical surface 72 thereof.

Accordingly, the electric wiring block according to the present embodiment can use only the necessary number of cassette blocks in accordance with the vehicle specifications and also can be fixed to the platform by the mounting bodies 68 which are respectively engaged with the two sides of the cassette blocks. That is, the present electric wiring block can be simplified in structure and can prevent occurrence of non-use cassette blocks, which is effective in saving resources.

As has been described hereinbefore, in the electric wiring block according to the invention, the block main body includes a plurality of cassette receiving chambers having the same shape, and different types of electric parts are classified into blocks by the types by a plurality of cassette blocks which respectively correspond to the plurality of cassette receiving chambers.

Therefore, since a desired number of various cassette blocks required according to the vehicle specifications can be easily fit into the cassette receiving chambers of the block main body, even when the number of poles of a fuse, a relay and the like is increased or decreased, such increase and decrease can be dealt with simply by changing the number of cassette blocks to be fitted. Due to this, two or more kinds of structures are possible through various combinations of the cassette blocks, which in turn makes it possible to provide a highly general-purpose electric wiring block which is able not only to reduce the total cost but also to cope with various vehicle specifications.

What is claimed is:

1. An electric wiring block comprising:
    a block body including a plurality of cassette receiving chambers, each of the cassette receiving chambers having an identical shape;
    a plurality of electric parts including a fuse and a relay to be mounted at various positions in the block body;
    a plurality of cassette blocks identical in shape with each other,
    a power distributing bus bar mounted in said block body; and
    a cassette bus bar mounted in each of said cassette blocks, each cassette bus bar corresponding to said power distributing bus bar, wherein each electric part is associated with one of said cassette blocks, and the electric parts are mounted to the block body at various locations when the cassette blocks are inserted into the cassette receiving chambers.

2. The electric wiring block according to claim 1, wherein each of said cassette receiving chambers includes an inner peripheral wall having a first lock portion used to fix a cassette block to the block body, and each of said cassette blocks includes a second lock portion corresponding to one of said first lock portions.

3. The electric wiring block as set forth in claim 1, wherein said power distributing bus bar includes a fitting portion having a spring property, and a male tab of said cassette bus bar to be fitted into said fitting portion projects out from a projection-purpose opening which is formed at a given position on a first side of said cassette block.

4. The electric wiring block as set forth in claim 3, wherein each of said cassette blocks includes, at a given position on a second side opposed to said projection-purpose opening side, an insertion-purpose opening through which a male tab of a cassette bus bar projecting out from another cassette block that adjoins said cassette block is inserted, and said cassette bus bar includes, at a position thereof opposed to said male tab, a fitting portion used to connect said male tab of its mating cassette bus bar.

5. The electric wiring block as set forth in claim 4, wherein each of said cassette blocks includes, on said insertion-purpose opening side thereof, a first lock portion for engagement with another cassette block adjoining said cassette block and, on said projection-purpose opening side thereof, a second lock portion which corresponds to said first lock portion.

6. The electric wiring block as set forth in claim 1, wherein a terminal with an electric wire provided within said block body includes in one end thereof a plurality of power distributing female terminals to be connected with the bus bars mounted within said cassette blocks, and in the other end thereof a male tab to be connected with a power source.

7. The electric wiring block as set forth in claim 1, wherein a power distributing bus bar including a plurality of male tabs is mounted into said block body, and a cassette bus bar including male tabs corresponding to said power distributing bus bar is mounted onto said cassette block, while there is interposed a female type terminal between said male tabs of said cassette bus bar and said power distributing bus bar.

8. The electric wiring block as set forth in claim 1, wherein each of said cassette blocks includes an insertion-purpose opening through which a male tab of a cassette bus bar projecting from another cassette block adjoining said cassette block is inserted, and a cassette bus bar wired within said cassette block includes a male tab formed at a position corresponding to said male tab of said cassette bus bar within another adjoining cassette block, while said male tab includes a female type terminal to be connected with said male tab of said cassette bus bar within said adjoining cassette block.

9. The electric wiring block as set forth in claim 5, wherein a plurality of said cassette blocks each including said first and second lock portions are engaged with each other to thereby form a group of cassette blocks, a first mounting body including a first lock portion and a second mounting body including a second lock portion are respectively engaged with the two end portions of said cassette block group, and said cassette block group is fixed to a platform by means of said first and second mounting bodies.

10. The electric wiring block as set forth in claim 1, wherein said power distributing bus bar to be mounted into said block body is divided for every pole, in correspondence to said cassette blocks respectively to be inserted into said cassette receiving chambers formed in said block body, into a power source bus bar having a male tab to be connected to a power source and a male tab to be connected to each of said cassette blocks, an intermediate bus bar, and a supply bus bar which adjoins said power source bus bar and includes a male tab to be connected to each of said cassette blocks.

11. The electric wiring block as set forth in claim 10, wherein said power distributing bus bar is divided for every pole, in correspondence to said cassette blocks respectively to be inserted into said cassette receiving chambers formed in said block main body, into said power source bus bar and a plurality of said supply bus bars, and each of said plurality of supply bus bars includes a male tab to be connected to each of said cassette blocks, a male tab to be connected to an adjoining bus bar on the power source side thereof, and a male tab to be connected to an adjoining bus bar on the terminal side thereof.

12. The electric wiring block as set forth in claim 10, wherein said supply bus bar and said power source bus bar are connected by means of electric wires.

13. The electric wiring block as set forth in claim 10, wherein said power source bus bar includes a mounting portion and said intermediate bus bar includes a mounting portion, while said power source bus bar and said intermediate bus bar are fixed to each other in said respective mounting portions thereof by a bolt and a nut.

14. The electric wiring block as set forth in claim 10, wherein said power source bus bar includes a connecting male tab and said intermediate bus bar includes a connecting male tab, while said power source bus bar and said intermediate bus bar are connected to each other by connecting said respective male tabs thereof to each other by use of a female type terminal.

15. The electric wiring block according to claim 2, wherein each first lock portion includes a lock claw having an engaging wall and a lance.

16. The electric wiring block according to claim 15, wherein each second lock portion includes a securing rib with a hole defined therein, the lance of one of said first lock portions engages the hole of the second lock portion when a cassette block is inserted into a cassette receiving chamber.

17. The electric wiring block according to claims 2, wherein each of said cassette blocks includes an outer surface with a plurality of second lock portions mounted thereon.

18. The electric wiring block according to claim 2, wherein the block body includes an outer surface with at least one securing rib mounted thereon.

19. The electric wiring block according to claim 3, wherein the block body includes a portion defining a hole through which wires connected to cassette blocks are able to pass when cassette blocks are mounted into cassette receiving chambers.

* * * * *